United States Patent
Nakanishi et al.

(10) Patent No.: US 6,730,438 B2
(45) Date of Patent: May 4, 2004

(54) NONAQUEOUS ELECTROLYTE SECONDARY CELLS AND PROCESS FOR FABRICATING SAME

(75) Inventors: Naoya Nakanishi, Tondabayashi (JP); Kouichi Satoh, Itami (JP); Toshiyuki Nohma, Hirakata (JP); Ikuo Yonezu, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 124 days.

(21) Appl. No.: 10/083,582

(22) Filed: Feb. 27, 2002

(65) Prior Publication Data

US 2002/0142211 A1 Oct. 3, 2002

Related U.S. Application Data

(62) Division of application No. 09/636,506, filed on Aug. 10, 2000.

(30) Foreign Application Priority Data

Aug. 10, 1999 (JP) ............................... 11-226490
Sep. 21, 1999 (JP) ............................ 11-267712

(51) Int. Cl.⁷ .......................... H01M 4/66; H01M 4/02
(52) U.S. Cl. .................. 429/245; 429/94; 429/211
(58) Field of Search ............ 429/94, 163, 178, 429/211, 129, 245

(56) References Cited

U.S. PATENT DOCUMENTS

| 6,010,801 A | 1/2000 | Nakamaru et al. | 429/161 |
| 6,013,389 A * | 1/2000 | Nakamaru et al. | 429/161 |

FOREIGN PATENT DOCUMENTS

| EP | 0 878 855 A1 | 11/1998 |
| JP | 55-156365 UM | 11/1980 |
| JP | 60-007058 | 1/1985 |
| JP | 60-072160 | 4/1985 |
| JP | 07-029564 | 1/1995 |
| JP | 10-261441 | 9/1998 |
| JP | 11-031497 | 2/1999 |

OTHER PUBLICATIONS

Patent Abstracts of Japan; vol. 10, No. 184 (E–415), Jun. 27, 1986 & JP 61 032353 A (Matsushita Electric Ind Co Ltd), Feb. 15, 1986 *abstract*.
Patent Abstracts of Japan, vol. 1995, No. 04, May 31, 1995 & JP 07 014569 A (Yuasa Corp), Jan. 17, 1995 *abstract*.
Patent Abstracts of Japan, vol. 009, No. 118 (E–316), May 23, 1985 & JP 60 007058 A (Shinkoube Denki KK), Jan. 14, 1985 *abstract*.
Patent Abstracts of Japan, vol. 006, No. 099 (E–111), Jun. 8, 1982 & JP 57 032569 A (Matsushita Electric Ind Co Ltd), Feb. 22, 1982 *abstract*.
Patent Abstracts of Japan, vol. 2000, No. 03, Mar. 30, 2000 & JP 11 345747 A (Hitachi Maxell Ltd), Dec. 14, 1999 *abstract*.

* cited by examiner

Primary Examiner—Stephen Kalafut
Assistant Examiner—Raymond Alejandro
(74) Attorney, Agent, or Firm—Kubovcik & Kubovcik

(57) ABSTRACT

A nonaqueous electrolyte secondary cell includes a rolled-up electrode unit composed of a positive electrode, a negative electrode and a separator interposed therebetween, and a negative electrode current collector plate and a positive electrode current collector plate joined to the respective ends of the electrode unit. The collector plate has a two-layer structure comprising a copper layer made of copper or an alloy consisting predominantly of copper, and a metal layer made of a metal not forming an intermetallic compound with lithium and having a lower laser beam reflectivity than copper or an alloy consisting predominantly of the metal. The collector plate has its copper layer contacted with an edge of the negative electrode projecting at one of the opposite ends of the electrode unit and welded thereto with a laser beam.

14 Claims, 22 Drawing Sheets

A-A

E-E

NONAQUEOUS ELECTROLYTE SECONDARY CELLS AND PROCESS FOR FABRICATING SAME

This application is a division of application Ser. No. 09/636,506, filed Aug. 10, 2000.

FIELD OF THE INVENTION

The present invention relates to nonaqueous electrolyte secondary cells, such as cylindrical lithium ion secondary cells, which comprise an electrode unit encased in a battery can and serving as an electricity generating element and which are adapted to deliver the electricity generated by the electrode unit to the outside via a positive terminal portion and a negative terminal portion like. The invention relates also to processes for fabricating such cells.

BACKGROUND OF THE INVENTION

Nonaqueous electrolyte secondary cells of the type mentioned comprise a rolled-up electrode unit formed by laying a positive electrode and a negative electrode, each in the form of a strip, over each other in layers with a separator interposed therebetween and rolling up the resulting assembly into a spiral form. The rolled-up electrode unit is encased in a battery can.

The electric power generated by the rolled-up electrode unit is delivered to the outside through an arrangement including a plurality of conductive current collector tabs having their base ends attached to each of the positive electrode and the negative electrode of the electrode unit. The positive current collector tabs extending from the positive electrode have outer ends connected to a positive terminal portion, and the negative current collector tabs extending from the negative electrode have outer ends connected to a negative terminal portion. This arrangement is widely used.

However, the current collecting arrangement comprising a plurality of collector tabs has the problem of failing to achieve a sufficient current collecting effect when used in nonaqueous electrolyte secondary cells of large size having a high current value since the cell has increased electrode areas although producing a satisfactory current collecting effect in nonaqueous electrolyte secondary cells of small size which are relatively low in current value.

Further the connection of the current collector tabs to each electrode terminal portion requires a complex structure and complicated procedure, hence the problem of low work efficiency or productivity.

Accordingly, a cylindrical nonaqueous electrolyte secondary cell has been proposed which has a current collecting structure comprising a negative electrode current collector plate 36 and a positive electrode current collector plate 30 as shown in FIG. 7. This cell has a battery can 1 formed by a cylinder 15 and lids 16, 16 secured to opposite open ends of the cylinder. A rolled-up electrode unit 2 is enclosed in the battery can 1. The negative electrode collector plate 36 and the positive electrode collector plate 30 are arranged at respective ends of the electrode unit 2 and joined to the unit 2 by laser welding. The collector plates 36, 30 are connected by lead portions 37, 34 respectively to a negative terminal assembly 4 and a positive terminal assembly 40 mounted on lids 16, 16.

The rolled-up electrode unit 2 comprises a positive electrode 23, separator 22 and negative electrode 21 each in the form of a strip. The positive electrode 23 is formed by coating a current collector of aluminum foil with a positive electrode active material. The negative electrode 21 is formed by coating a current collector of copper foil with a negative electrode active material.

The positive electrode 23 and the negative electrode 21 are each superposed on the separator 22, as displaced from the separator widthwise thereof and rolled up into a spiral form, whereby the edge of the positive electrode 23 is positioned as projected outward beyond the edge of the separator 22 at one of opposite ends of the electrode unit 2 in the direction of its winding axis, and the edge of the negative electrode 21 is positioned as projected outward beyond the edge of the separator 22 at the other end of the unit 2. The positive electrode current collector plate 30 is made of aluminum, and the negative current collector plate 36 is made of copper.

With the current collecting structure wherein the collector plates 36, 30 are joined to the respective ends of the electrode unit 2 as described above, the collector plates can be welded to the unit 2 contactlessly without applying pressure to the plates for welding. This achieves an improved work efficiency or productivity.

The process for fabricating the nonaqueous electrolyte secondary cell shown in FIG. 7, however, has the problem that when the negative electrode collector plate 36 is disposed at and welded to the edge of the negative electrode 21 of the unit 2, sufficient energy can not be given to the portion to be welded since the copper forming the collector plate 36 has high reflectivity for the laser beam used for welding, forming a faulty weld and increasing the electric resistance between the unit 2 and the negative electrode collector plate 36 to result in an impaired current collecting efficiency. If the collector plate 36 is made from nickel, the weldability of the plate 36 to the electrode unit 2 can be improved, whereas the collector plate 36 of nickel has greater electric resistance than the plate 36 of copper and therefore exhibits a lower current collecting efficiency.

FIGS. 20 and 23 show another conventional nonaqueous electrolyte secondary cell, which comprises a cylindrical battery can 1 including a cylinder 15 and lids 16, 16 welded to respective opposite ends of the cylinder, and a rolled-up electrode unit 5 enclosed in the can 1. A pair of positive and negative terminal assemblies 110, 110 are mounted on the respective lids 16, 16 and each connected to the electrode unit 5 by a plurality of electrode tabs 6 for delivering the electric power generated by the unit 5 to the outside through the terminal assemblies 110, 110. Each lid 6 is provided with a gas vent valve 13 which is openable with pressure.

As shown in FIG. 22, the rolled-up electrode unit comprises a positive electrode 51 and a negative electrode 52 each in the form of a strip and rolled up into a spiral form with a striplike separator 52 interposed between the electrodes. The positive electrode 51 is prepared by coating opposite surfaces of a striplike current collector 55 of aluminum foil with a positive electrode active material 54 comprising a lithium containing composite oxides. The negative electrode 53 is prepared by coating opposite surfaces of a striplike current collector 57 of copper foil with a negative electrode active material 56 containing a carbon material. The separator 52 is impregnated with a nonaqueous electrolyte.

The positive electrode 51 has an uncoated portion having no active material 54 applied thereto, and base ends of the electrode tabs 6 are joined to the uncoated portion. Similarly, the negative electrode 53 has an uncoated portion having no active material 56 applied thereto, and base ends of the electrode tabs 6 are joined to the uncoated portion.

With reference to FIG. 23, the electrode tabs 6 of the same polarity have outer ends 61 connected to one electrode terminal assembly 110. For the sake of convenience, FIG. 23 shows only some of the electrode tabs as connected at their outer ends to the terminal assembly 110, with the connection of the other tab outer ends to the assembly 110 omitted from the illustration.

The electrode terminal assembly 110 comprises an electrode terminal 111 extending through and attached to the lid 16 of the battery can 1. The electrode terminal 111 has a base end formed with a flange 112. The hole in the lid 16 for the terminal 111 to extend therethrough has an insulating packing 113 fitted therein to provide electrical insulation and a seal between the lid 16 and fastening members. The terminal 111 has a washer 114 fitted therearound from outside the lid 16, and a first nut 115 and a second nut 116 which are screwed thereon. The insulating packing 113 is clamped between the flange 112 of the terminal 111 and the washer 114 by tightening up the first nut 115 to produce an enhanced sealing effect. The outer ends 61 of the electrode tabs 6 are secured to the flange 112 of the terminal 111 by spot welding or ultrasonic welding.

Lithium ion secondary cells have the problem that an increase in the size thereof lengthens the positive and negative electrodes, consequently lowering the current collecting efficiency of the current collecting structure comprising electrode tabs to produce variations in internal resistance or result in a lower discharge capacity.

FIG. 21 shows a current collecting structure proposed to obtain a uniform current collecting efficiency over the entire lengths of the positive and negative electrodes. The proposed structure is provided for a rolled-up electrode unit 7, which comprises a positive electrode 71 prepared by coating a current collector 75 with a positive electrode active material 74, a negative electrode 73 formed by coating a current collector 77 with a negative electrode active material 76 and a separator 72 impregnated with a nonaqueous electrolyte. The positive electrode 71 and the negative electrode 73 are each superposed on the separator 72 as displaced widthwise of the separator, and rolled up into a spiral form, whereby the edge 78 of current collector 75 of the positive electrode 71 is positioned as projected outward beyond the edge of the separator 72 at one of opposite ends of the electrode unit 7 in the direction of its winding axis, and the edge 78 of current collector 77 of the negative electrode 73 is positioned as projected outward beyond the edge of the separator 72 at the other end of the unit 7.

A disklike current collector plate 62 is secured to each of opposite ends of the rolled-up electrode unit 7 by resistance welding and connected to the same electrode terminal assembly 110 as described above by a lead member 63.

The nonaqueous electrolyte secondary cell with the current collecting structure of FIG. 21, however, has the problem of being great in the internal resistance of the cell because the edges 78, 78 of the current collectors 75, 77 forming the positive electrode 71 and the negative electrode 73 of the electrode unit 7 have a small area, therefore providing a small area of contact between the collector plate 62 and each current collector edge.

It is especially required that lithium ion secondary cells, for example, for use as power sources in electric motor vehicles be of high capacity and reduced in internal resistance to the greatest possible extent so as to obtain a high power. Furthermore a current collecting structure of high productivity is required for a reduction of manufacturing cost.

Accordingly, a cell of low resistance and high productivity has been proposed which comprises a current collector plate having small bulging portions formed thereon as uniformly distributed over the entire surface thereof, such that the collector plate is secured to a current collector edge by resistance welding with the bulging portions in contact therewith to concentrate the current on the bulging portions and give improved weld strength (see, for example, JP-U No. 156365/1980).

As shown in FIG. 24, also proposed is a current collecting structure which comprises a current collector plate 92 prepared by forming a plurality of bent portions 94 on a flat platelike body 93, the bent portions 94 being secured to a current collector edge 78 of a rolled-up electrode unit 7 by resistance welding with the collector plate 92 pressed against the current collector edge 78 (see, for example, JP-A No. 31497/1999).

Further known are a current collector plate comprising two divided segments for suppressing ineffective current involved in attaching the collector plate by resistance welding to achieve an improved welding efficiency (JP-A No. 29564/1995), and a current collector plate having a projection V-shaped in section and formed on the portion thereof to be joined by resistance welding so as to concentrate the welding current on the projection and afford improved weld strength (JP-B No. 8417/1990).

Further proposed is a current collecting structure comprising a current collector member 95 in place of the disklike collector plate and formed with a plurality of slits 96 as seen in FIG. 25. For laser welding, a laser beam is projected onto the surface of the collector member 95 as disposed at an end of a rolled-up electrode unit 7, with a current collector edge 78 fitted in the slits 96 of the member 95 (JP-A No. 261441/1998).

Also proposed is a structure wherein a disklike current collector plate has a plurality of projections, V-shaped in section and up to 90° in end angle, and is welded to a group of electrode plates by irradiating the projections with a laser beam, with the collector plate pressed against each current collector (JP-B No. 4102/1990).

However, with the above-mentioned current collecting structure wherein the current collector plate is formed with small bulging portions as uniformly distributed over the entire surface thereof (JP-U No. 156365/1980), the collector plate is in unstable contact with the current collector, and the current fails to flow across these members depending on the state of contact, entailing the problem of producing a faulty weld.

The current collecting structure wherein the current collector plate has projections which are V-shaped in section or bent portions for the resistance welding of the plate (JP-A No. 31497/1999, No. 29564/1995 or JP-B No. 8417/1990) has the problem of low weld strength when the current collector has a very small thickness as is the case with lithium ion secondary cells.

The current collecting structure wherein the current collector member having a plurality of slits is secured to the current collector edge by laser welding (JP-A No. 261441/1998) not only requires the collector member which has a complex shape but also has the problem that the work of inserting the current collector edge into the slits of the collector member is very cumbersome.

With the structure wherein the disklike current collector plate having projections of V-shaped section is joined to the group of electrode plates by laser welding (JP-B No. 4102/1990), the projections have a V-shaped section of acute angle, so that the area of contact between the projection and the current collector edge is small, consequently entailing the problem of increased contact resistance. Since the junction between the V-shaped projection and the current collector edge is at an acute angle with the direction of projection of the laser beam for irradiating the junction, the laser beam fails to act effectively to weld the junction and is likely to produce a faulty weld.

SUMMARY OF THE INVENTION

A first object of the present invention is to provide the construction of a nonaqueous electrolyte secondary cell having a current collecting structure wherein a negative electrode current collector plate is secured to an end of an electrode unit by welding, and to provide a process for fabricating the cell, the collector plate having improved weldability to the electrode unit.

A second object of the invention is to provide a nonaqueous electrolyte secondary cell having a current collecting structure which is high in productivity and which is so adapted that even when a current collector forming an electrode unit is very thin, an edge of the current collector can be joined to a current collector plate over an increased area of contact, and a process for fabricating the cell.
Construction for Fulfilling First Object The present invention provides a nonaqueous electrolyte secondary cell comprising an electrode unit 2 which includes a negative electrode 21 having a projecting edge at one of opposite ends of the electrode unit in the direction of winding axis thereof. A negative electrode current collector plate 3 is joined to the edge and electrically connected to a negative terminal portion. The collector plate 3 comprises a plurality of layers including a copper layer 31 made of copper or an alloy consisting predominantly of copper, and a metal layer made of a metal not forming an intermetallic compound with lithium and having a lower laser beam reflectivity than copper or an alloy consisting predominantly of the metal. The copper layer 31 and the metal layer provide opposite surface layers of the collector plate 3, and the copper layer 31 is welded to the edge of the negative electrode 21. The metal for forming the metal layer of the negative electrode current collector plate 3 is, for example, nickel, stainless steel, titanium, chromium or molybdenum.

When the collector plate 3 is welded to the negative electrode edge of the electrode unit 2 with a laser beam in the process for fabricating the nonaqueous electrolyte secondary cell of the invention, the laser beam can be sufficiently absorbed by the collector plate 3 for perfect welding since the laser beam impinging side of the plate 3 is provided by the metal layer which is low in laser beam reflectivity.

The metal layer of the collector plate 3 is made of a metal not forming an intermetallic compound with lithium or an alloy consisting predominantly of the metal and is therefore unlikely to consume lithium ions in the nonaqueous electrolyte to form an alloy, consequently precluding the lithium ion concentration of the nonaqueous electrolyte from reducing.

Further because the negative electrode current collector plate 3 comprises a plurality of layers, i.e., the copper layer 31 and the metal layer, the high conductivity of the copper layer gives the plate 3 lower electric resistance and higher electric conductivity than when the plate 3 consists solely of the metal layer.

The edge of the negative electrode 21 of the electrode unit 2 is joined to the copper layer 31 of the collector plate 3 over the entire length thereof, consequently making it possible to collect the current from the entire electrode unit 2 uniformly even if the cell is large-sized with an increase in the length of the electrodes. This reduces the potential gradient along the length of the negative electrode 21, giving a uniform current distribution, whereby a high current collecting efficiency can be achieved.

Stated more specifically, the negative electrode current collector plate 3 has a thickness in the range of 0.10 mm to 5.00 mm. If the thickness is smaller than 0.10 mm, the collector plate 3 itself has increased electric resistance, which not only results in a lower current collecting efficiency but also permits the collector plate 3 to become melted to excess by laser welding to produce a cave-in in the weld. If the thickness is in excess of 5.00 mm, on the other hand, welding of the collector plate 3 requires increased power, presenting difficulty in welding the collector plate 3 to the negative electrode edge which is tens of micrometers in thickness.

Further stated more specifically, the ratio of the thickness of the metal layer to the thickness of the negative electrode current collector plate 3 is in the range of at least 5% to not greater than 45%. This enables the metal layer to fully serve the function of exhibiting reduced laser beam reflectivity, also permitting the copper layer 31 to satifactorily perform the function of exhibiting reduced electric resistance. If the ratio is smaller than 5%, the metal layer disappears on melting immediately after the start of welding of the collector plate 3 to expose a surface of high laser beam reflectivity, hence impaired weldability. When the ratio is in excess of 45%, on the other hand, the metal layer becomes predominant with respect to the electric resistance of the collector plate 3, increasing the overall electric resistance of the plate 3.

The present invention further provides a process for fabricating a nonaqueous electrolyte secondary cell which process has the steps of:

preparing an electrode unit 2 by laying a positive electrode 23 and a negative electrode 21 over each other with a separator 22 sandwiched therebetween so as to project an edge of the positive electrode 23 at one of opposite ends of the electrode unit 2 and to project an edge of the negative electrode 21 at the other end and rolling up the resulting assembly into a spiral form, preparing a positive electrode current collector plate 30 from aluminum or an alloy consisting predominantly of aluminum, preparing a negative electrode current collector plate 3 comprising a plurality of layers including a copper layer 31 made of copper or an alloy consisting predominantly of copper, and a metal layer made of a metal not forming an intermetallic compound with lithium and having a lower laser beam reflectivity than copper or an alloy consisting predominantly of the metal, the copper layer 31 and the metal layer providing respective opposite surface layers of the collector plate 3, welding the positive electrode current collector plate 30 to the edge of the positive electrode 23 by placing the collector plate 30 at the end of the electrode unit 2 having the projecting edge of the positive electrode 23 and irradiating a surface of the collector plate 30 with a laser beam, welding the negative electrode current collector plate 3 to the edge of the negative electrode 21 by placing the collector plate 3 at the end of the electrode unit 2 having the projecting edge of the negative electrode 21, with the copper layer 31 in contact with the negative electrode edge, and irradiating a surface of the metal layer of the collector plate 3 with a laser beam, and assembling a nonaqueous electrolyte secondary cell by electrically connecting the positive electrode current collector plate 30 and the negative electrode current collector plate 3 which are welded to the electrode unit 2 to a positive terminal portion and a negative terminal portion respectively.

In the step of welding the negative electrode current collector plate 3 to the edge of the negative electrode 21 with a laser beam in the fabrication process of the invention described above, the laser beam is projected on the surface of the metal layer of low reflectivity, so that the energy of the laser beam can be fully given to the junction of the collector plate 3 and the edge of the negative electrode 21, consequently welding the plate 3 and the negative electrode edge to each other completely.

In the step of welding the positive electrode current collector plate 30 to the edge of the positive electrode 23 with a laser beam, the aluminum forming the collecting plate 30 is low in laser beam reflectivity, so that the energy of the laser beam can be fully given to the junction of the collector plate 30 and the edge of the positive electrode 23, consequently welding the plate 30 and the positive electrode edge to each other completely.

In the assembling step, the positive electrode current collector plate 30 and the negative electrode current collector plate 3 are electrically connected to the positive terminal portion and the negative terminal portion, respectively.

This sufficiently lowers the electric resistance of the conductors extending from the electrode unit 2 to the terminal portions to achieve a high current collecting efficiency.

The nonaqueous electrolyte secondary cell and the process for fabricating the cell according to the invention give the negative electrode current collector plate improved weldability to the electrode unit, whereby a high current collecting efficiency can be attained as described above.

Construction for Fulfilling Second Object

Another nonaqueous electrolyte secondary cell comprises an electrode unit 7 encased in a battery can 1 and comprising as superposed in layers a positive electrode 71, a negative electrode 73 and a separator 72 interposed between the electrodes and impregnated with a nonaqueous electrolyte, each of the positive electrode 71 and the negative electrode 73 being formed by coating a striplike current collector with an active material. The cell is adapted to deliver electric power generated by the electrode unit 7 to the outside via a pair of electrode terminals.

The current collector of the positive electrode 71 or the negative electrode 73 has a projecting edge 78 at at least one of opposite ends of the electrode unit 7, and a current collector plate 8 is joined to the edge 78 and has a plurality of protrusions 82 formed on a surface thereof opposed to the current collector edge 78. Each of the protrusions is shaped to have a circular-arc section or polygonal (e.g., trapezoidal) section with at least four corners, the collector plate 8 being welded to the current collector edge 78 with the protrusions 82 forced therein and being connected to one of the electrode terminals.

The present invention further provides a process for fabricating a nonaqueous electrolyte secondary cell which process has the steps of:

preparing an electrode unit 7 wherein an edge 78 of current collector of each of a positive electrode 71 and a negative electrode 73 is positioned as projected outward beyond an edge of a separator 72 by laying the positive electrode 71 and the negative electrode 73 over the separator 72 as displaced from the separator widthwise thereof and rolling up the resulting assembly into a spiral form, preparing current collector plates 8 each by forming in a flat platelike body 81 having electric conductivity a plurality of protrusions 82 each shaped to have a circular-arc section or polygonal section having at least four corners, welding the collector plates 8 respectively to the projecting current collector edges 78 at the respective ends of the electrode unit 7 by placing each collector plate 8 over the current collector edge 78 in pressing contact therewith and irradiating each protrusion 82 of the collector plate 8 with a laser beam or electron beam, with the protrusion 82 forced into the current collector edge 78, and placing the electrode unit 7 having the collector plates 8 welded thereto into a battery can 1 and connecting the collector plates 8 to respective electrode terminals.

With the nonaqueous electrolyte secondary cell and the fabrication process thereof according to the invention described, the current collector plate 8 is pressed against the current collector edge 78 of the electrode unit 7, whereby each protrusion 82 of the collector plate 8 is forced or wedged into the current collector edge 78, forming a joint face in the current collector edge 78 in conformity with the contour of the protrusion 82, for example, a cylindrical joint face. The joint face has a larger area than is formed by a protrusion which is V-shaped in section.

Accordingly, when the collector plate 8 is welded to the current collector edge 78 by irradiating the junction of each protrusion 82 and the current collector edge 78 with a laser beam or electron beam, the plate 8 is joined to the current collector edge 78 over a large area of contact. This results in diminished contact resistance and a higher current collecting efficiency.

The junction of the collector plate protrusion 82 and the current collector edge 78 will be positioned at 90° or approximately at this angle with the direction of projection of the beam at the midportion of the junction, so that the laser beam or electron beam acts effectively for welding the junction, consequently affording a high weld strength due to the large area of the junction.

Stated more specifically, the current collector plate 8 comprises a flat platelike body 81 formed with the protrusions 82 and one or a plurality of liquid inlets 83, and the opening area provided by the liquid inlets 83 is at least 15% of the flat area of the body. When the electrolyte is placed into the cell 1 can in the step of assembling the cell, the electrolyte flows through the liquid inlets 83 in the current collector plate 8 of this structure and is fed to the electrode unit 7. This shortens the time required to impregnate the separator 72, positive electrode 71 and negative electrode 73 with the electrolyte. If the opening ratio provided by the liquid inlets 83 is smaller than 15%, the electrolyte encounters difficulty in passing through the collector plate 8 and therefore requires a prolonged period of time for impregnation. However, if the opening ratio given by the liquid inlets 83 is in excess of 90%, the current path becomes greatly constricted, increasing the electric resistance of the collector plate 8 and leading to a lower current collecting efficiency. Accordingly, it is desirable that the opening ratio given by the liquid inlets 83 be in the range of 15% to 90%.

Alternatively, the current collector plate 8 comprises a flat platelike body 81 formed with the protrusions 82 and integrally provided with a striplike lead portion 85, the lead portion 85 having an outer end connected to the electrode terminal. The lead portion 85 of this structure is easily connectable to the electrode terminal, further serving to diminish the electric resistance between the electrode unit 7 and the electrode terminal.

A current collector plate 100 of another structure comprises a flat platelike body 101 provided at an outer peripheral portion thereof with a current collector pressing portion 106 positioned in the vicinity of each protrusion 102 for pressing an end portion of the current collector 77 of the electrode unit 7 inwardly of the electrode unit 7. With this structure, the end portion of the current collector 77 is deflected inwardly of the electrode unit 7 by being pressed by the current collector pressing portion 106, whereby the position of contact of the current collector end with the protrusion 102 of the collector plate 100 is shifted also inwardly of the electrode unit 7. Accordingly, when the collector plate protrusion 102 is to be welded to the end portion of the current collector 77, the laser beam or electron beam need not be projected onto the radial outer end of the protrusion but the protrusion needs only to be irradiated up to a position slightly inwardly of its outer end, i.e., up to the position where the deflected portion of the current collector 77 is in contact with the protrusion. This eliminates the likelihood that the beam will be projected outside beyond the outer periphery of the collector plate 100, consequently precluding the current collector 77 or separator 72 from melting by being directly irradiated with the beam.

The pressing face of the current collector pressing portion 106 for the current collector 77 and the surface of the platelike body 101 of the collector plate 100 make an angle in the range of at least 30° to not greater than 45°. When the angle is limited to this range, the outer end of the current collector 77 can be effectively deflected inwardly of the electrode unit 7.

According to the process of the invention described for fabricating nonaqueous electrolyte secondary cells, it is desirable that the protrusions 82 of the collector plate 8 have a width of at least 0.8 times the diameter of the spot of the laser beam or electron beam. For example, when the protrusion 82 of the collector plate 8 has a semicircular form in section, it is desired that the diameter of the semicircle be at least 0.8 times the spot diameter of the laser beam or electron beam. Further when the collector plate protrusion 82 has a trapezoidal form in section, it is desired that the width of the upper side (short side) of the trapezoid be at least 0.8 times the spot diameter of the laser beam or electron beam. This enables the laser beam or electron beam to give energy concentrically on the junction of the collector plate protrusion 82 and the current collector edge 78, fully melting the portions to be joined and giving a large joint area and high weld strength.

The distance the protrusion 82 of the collector plate 8 projects is preferably at least 0.5 mm to not greater than 3 mm. If the distance of projection of the protrusion 82 is smaller than 0.5 mm, it is impossible to force the protrusion 82 into all turns of the current collector at the edge 78 in the case where the edge portions 78 of turns of the current collector of the electrode unit 7 are not positioned uniformly in a plane, consequently failing to afford sufficient weld strength. Further when the distance of projection of the protrusion 82 is in excess of 3 mm, the effect to improve the weld strength will level off, while a greater dead space is created in the interior of the battery can 1 to entail a lower energy density relative to the volume.

The thickness of the current collector plate 8 is preferably at least 0.1 mm to not greater than 2 mm. If the thickness is smaller than 0.1 mm, the collector plate 8 has increased electric resistance to exhibit a lower current collecting efficiency. Further if the thickness is greater than 2 mm, the effect to improve the current collecting efficiency levels off, while the lead portion 85 formed integrally with the plate 8 will not be workable without a problem.

Further it is desired that the wall thickness of the protrusion 82 of the current collector plate 8 be smaller than the thickness of the flat platelike body 81. The flat portion then has a greater thickness, ensuring a satisfactory current collecting efficiency without impairment, while the portion to be irradiated with a beam has a small thickness and therefore permits welding with low energy.

Usable as the material for the current collector plate 8 is Cu, Al, Ni, SUS, Ti or an alloy of such metals. Use of these materials provides cells which are excellent in corrosion resistance to nonaqueous electrolytes and in conductivity.

According to the present invention providing nonaqueous electrolyte secondary cells and processes for fabricating such cells, the current collector plate can be joined to the current collector edge over a large contact area even if the current collector forming the electrode unit has a very small thickness as described above, hence high productivity.

DETAILED DESCRIPTION OF EMBODIMENTS

Cylindrical lithium ion secondary cells embodying the present invention will be described below with reference to the drawings.

[1] First Embodiment

Figure 1:
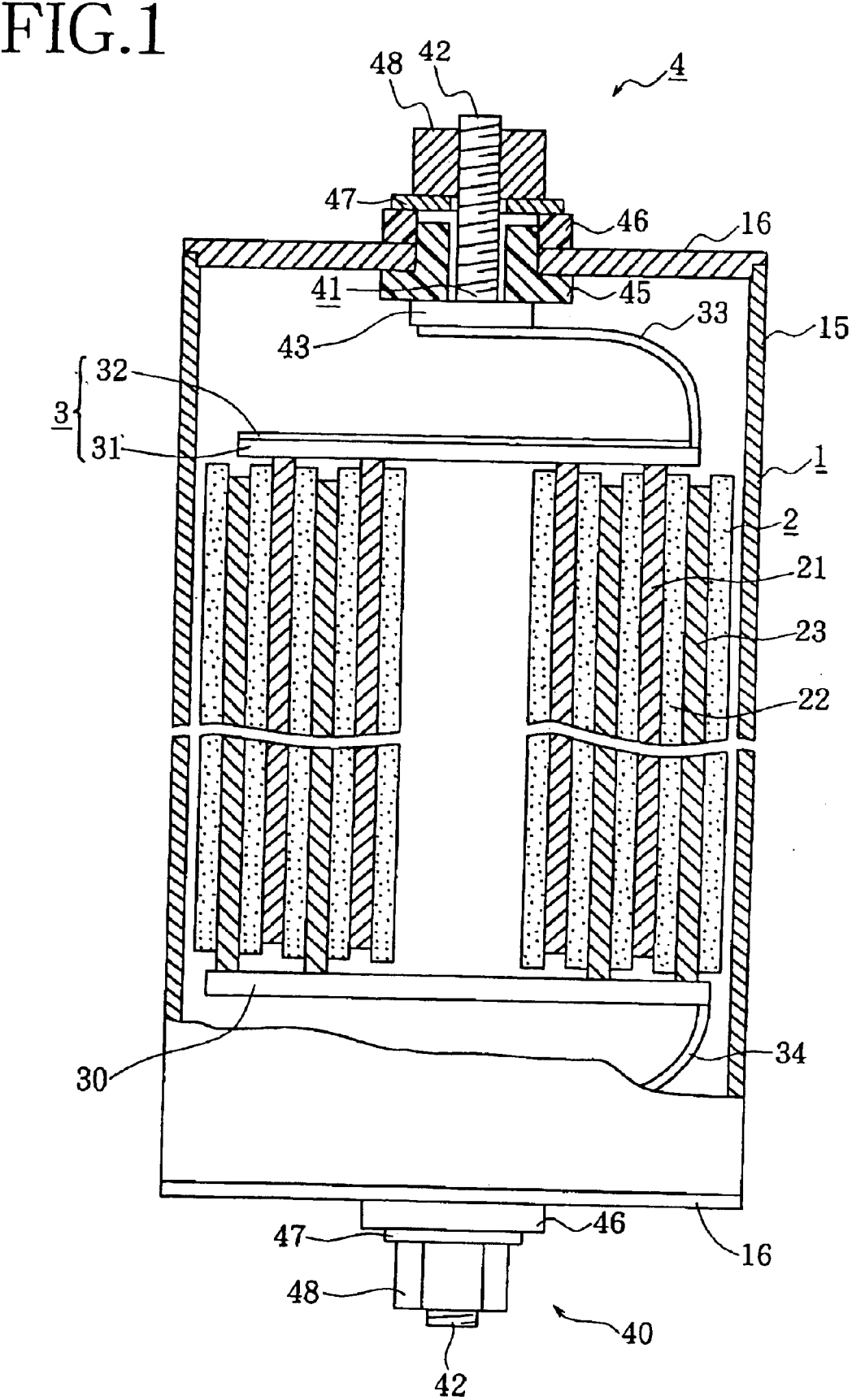
FIG. 1 is a view in section of a cylindrical lithium ion secondary cell according to the invention.

As shown in FIG. 1, the cylindrical lithium ion secondary cell of this embodiment comprises a battery can 1 formed by fixing lids 16, 16 to opposite open ends of a cylinder 15. A rolled-up electrode unit 2 is encased in the battery can 1. Arranged respectively at opposite ends of the electrode unit 2 are a negative electrode current collector plate 3 and a positive electrode current collector plate 30 each comprising two layers, i.e., a copper layer 31 and a metal layer made of a metal not forming an intermetallic compound with lithium and having a lower laser beam reflectivity than copper or an alloy consisting predominantly of the metal. Each collector plate is welded to the end of the unit 2 with a laser beam. The collector plates 3 and 30 are connected by respective lead portions 33, 34 to a negative terminal assembly 4 and a positive terminal assembly 40 mounted on the lids 16, 16.

Figure 4:
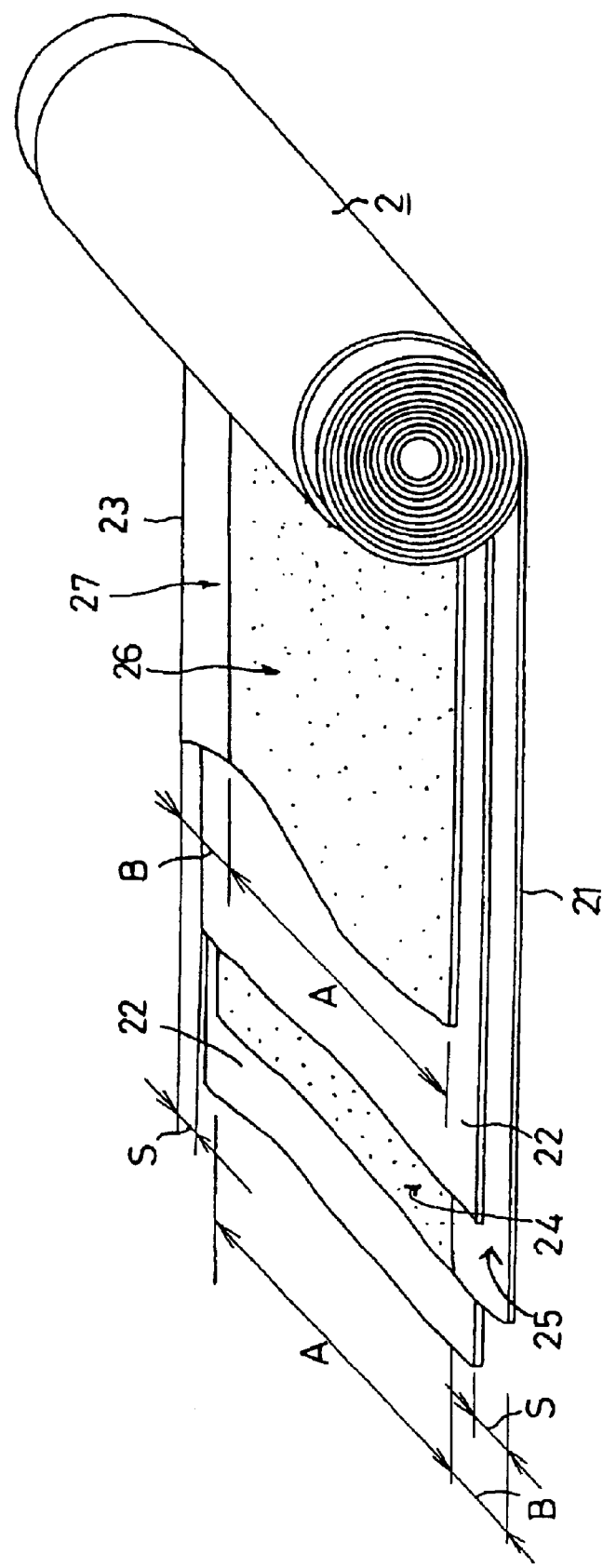
FIG. 4 is a perspective view partly in development of the rolled-up electrode unit.

With reference to FIG. 4, the rolled-up electrode unit 2 comprises a positive electrode 23, separator 22 and negative electrode 21 each in the form of a strip. The positive electrode 23 is formed by coating a current collector of aluminum foil with a positive electrode active material 26 comprising $LiCoO_2$. The negative electrode 21 is formed by coating a current collector of copper foil with a negative electrode active material 24 comprising natural graphite.

The positive electrode 23 and the negative electrode 21 are each superposed on the separator 22 as displaced widthwise thereof and are rolled up into a spiral form, whereby an edge (uncoated portion 25) of the rolled-up negative electrode 21 is positioned as projected outward beyond the edge of the separator 22 at one of opposite ends of the electrode unit 2 in the direction of its winding axis, and an edge (uncoated portion 27) of the rolled-up positive electrode 23 is positioned as projected outward beyond the edge of the separator 22 at the other end of the unit 2.

For example, the active material coatings 24, 26 of the electrodes can be tens of millimeters in width A, the uncoated portions 25, 27 about 10 mm in width B, and the distance S of projection beyond the separator 22 about 1 to about 3 mm.

Figure 2:
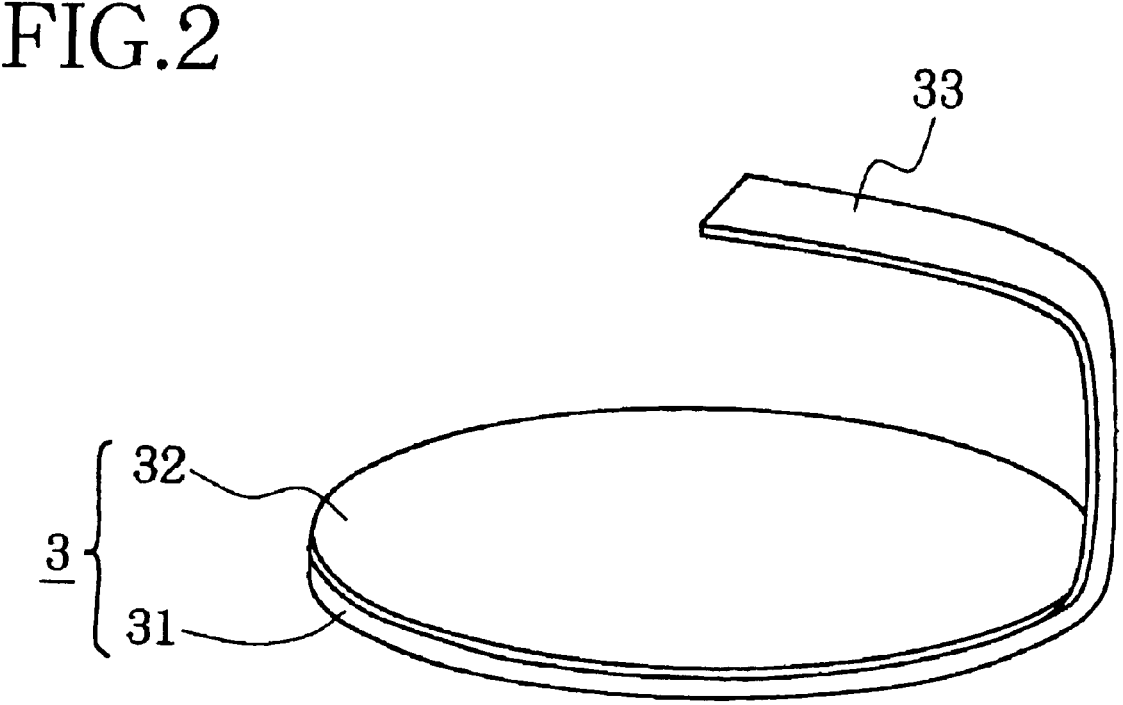
FIG. 2 is a perspective view of a negative electrode current collector plate.
Figure 5:
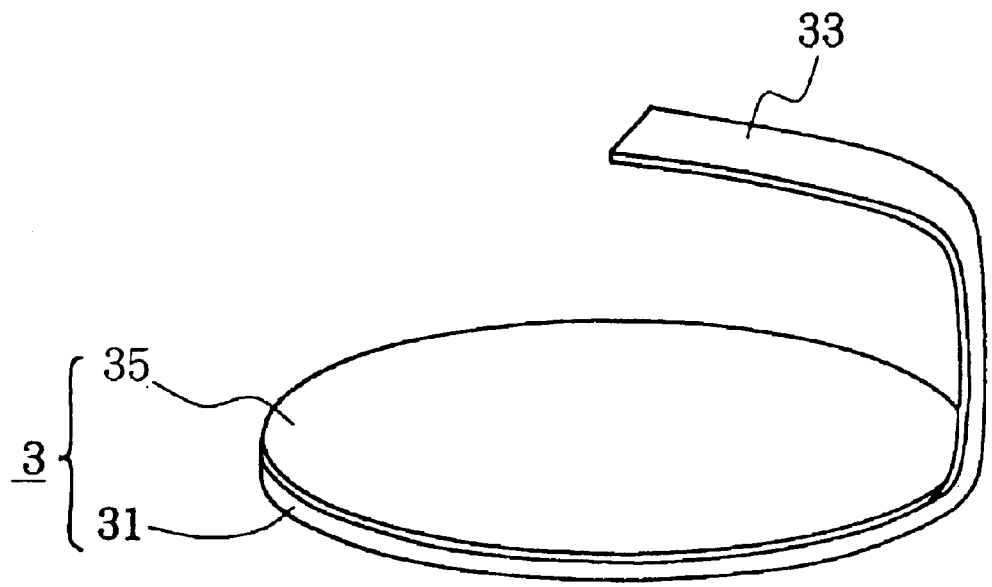
FIG. 5 is a perspective view of a negative electrode current collector plate of another structure.

As shown in FIGS. 1 and 2, the negative electrode current collector plate 3 is in the form of a disk and has a two-layer structure, i.e., a copper layer 31 having a thickness of 2.40 mm and a nickel layer 32 having a thickness of 0.60 mm and made from nickel which is a metal not forming an intermetallic compound with lithium and having a lower laser beam reflectivity than copper. The lead portion 33, which is made of copper, extends from an end portion of the collector plate 3. Also usable as the collector plate 3 is one having the same structure as above except that the nickel layer 32 is replaced by a stainless steel layer 35 as seen in FIG. 5. Further usable is a negative electrode current collector plate 3 having a three-layer structure, i.e., a copper layer 31 and a nickel layer 32 providing opposite surface layers and a stainless steel layer 39 sandwiched between the two layers. Furthermore, the nickel layer 32 or stainless steel layer 35 can be replaced by a layer of a metal, such as titanium layer, chromium layer or molybdenum layer, insofar as the metal forms no intermetallic compound with lithium and has a lower laser beam reflectivity than copper.

As shown in FIG. 1, on the other hand, the positive current collector plate 30 is similarly in the form of a disk, made from an aluminum plate having a thickness of 1.00 mm and provided with the lead portion 34 which is made of aluminum.

Figure 3:
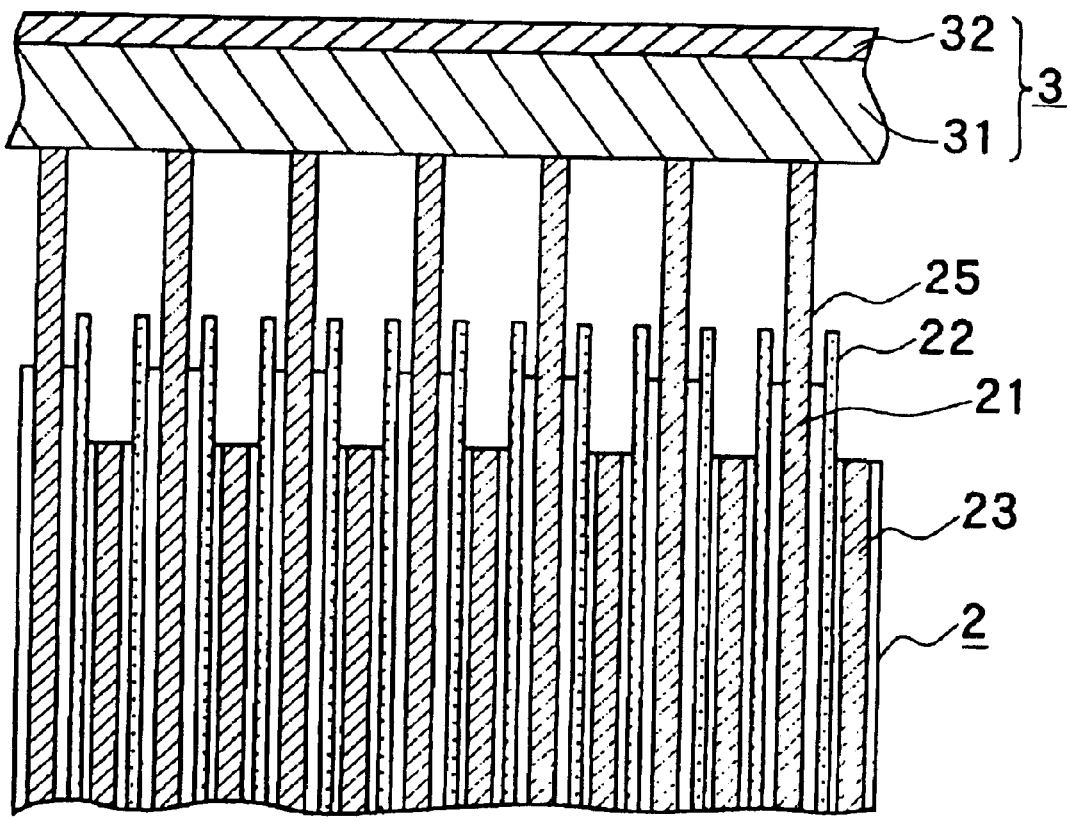
FIG. 3 is a sectional view showing the step of welding the negative electrode current collector plate to a rolled-up electrode unit with a laser beam.

With reference to FIG. 3, the negative electrode current collector plate 3 is disposed at one end of the electrode unit 2 with the copper layer 31 in contact with the edge (uncoated portion 25) of the negative electrode 21 of the unit 2, and is welded to the edge of the negative electrode 21 by being irradiated with a laser beam over the surface of the nickel layer 32.

The positive electrode current collector plate 30 is disposed likewise at the other end of the electrode unit 2 and welded to the edge of the positive electrode 23 by being irradiated with a laser beam over the surface thereof.

As shown in FIG. 1, the negative terminal assembly 4 comprises a terminal member 41 having a screw shank 42 and a flange 43 projecting from the lower end of the shank 42. The screw shank 42 of the terminal member 41 extends through the lid 16, and a first insulating member 45 and a second insulating member 46 are fitted around the terminal member 41 to provide electrical insulation and a seal between the lid 16 and the terminal member 41. The terminal member 41 has a washer 47 fitted therearound and a nut 48 screwed on its outer end. The positive terminal assembly 40 also has the same construction as the assembly 4.

The lead portion 33 extending from the collector plate 3 has its outer end welded to the flange 43 of terminal member 41 of the negative terminal assembly 4. The lead portion 34 extending from the positive collector plate 30 has its outer end welded to the flange 43 of terminal member 41 of the positive terminal assembly 40. This arrangement makes it possible to deliver the power generated by the rolled-up electrode unit 2 from the negative and positive terminal assemblies 4, 40.

The lithium ion secondary cell of the present invention is fabricated by the process to be described below.

Preparation of Rolled-up Electrode Unit 2

A positive electrode 23 is prepared by mixing together a positive electrode active material comprising $LiCoO_2$, an auxiliary conductive agent comprising carbon and a binder comprising polyvinylidene fluoride (PVdF) to obtain a positive electrode composition and coating opposite surfaces of a current collector in the form of a strip of aluminum foil with the composition as shown in FIG. 4. The positive electrode current collector has one edge portion left uncoated with the active material layer to provide an uncoated portion 27 of 10 mm in width.

A negative electrode 21 is prepared by mixing together a negative electrode active material comprising natural graphite and a binder comprising polyvinylidene fluoride (PVdF)

to obtain a negative electrode composition and coating opposite surfaces of a current collector in the form of a strip of copper foil with the composition. The negative electrode current collector has one edge portion left uncoated with the active material layer to provide an uncoated portion 25 of 10 mm in width.

Further prepared is a separator 22 having a width slightly larger than the width A of the coated portion of the positive electrode and the coated portion of the negative electrode. The separator 22 is made from porous polyethylene and polypropylene.

The positive electrode 23, separator 22 and negative electrode 21 are thereafter laid over one another and rolled up into a spiral form as shown in FIG. 4 to obtain a rolled-up electrode unit 2. At this time, these components are arranged in layers so that the edges of the positive electrode uncoated portion 27 and the negative electrode uncoated portion 25 are positioned as projected outward beyond the respective edges of the separator 22.

Preparation of Current Collector Plates 30, 3

Figure 6:
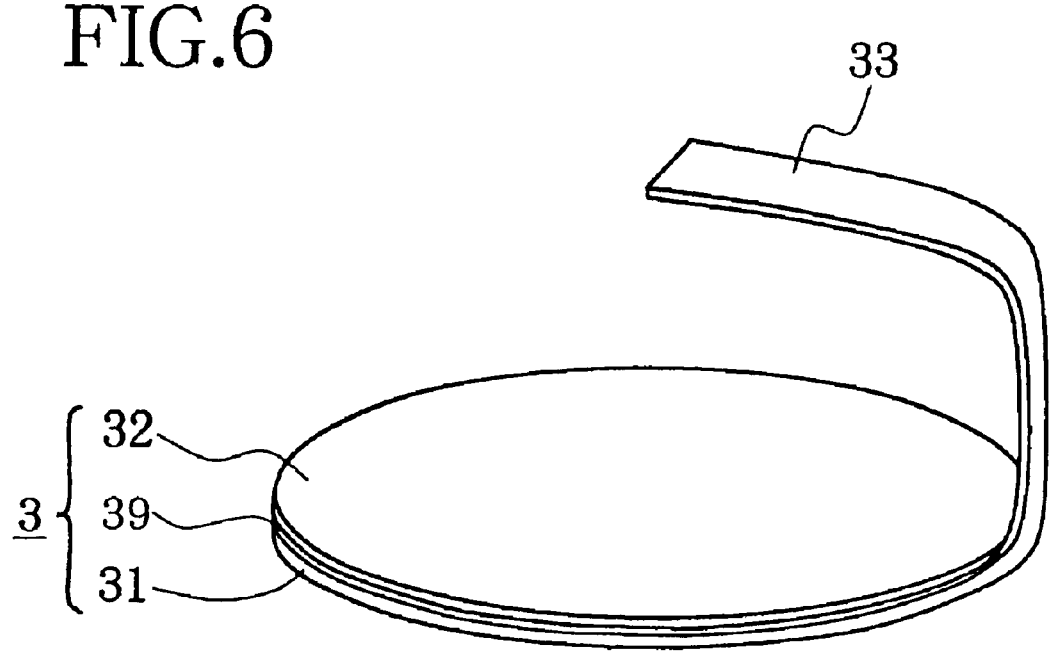
FIG. 6 is a perspective view of a negative current collector plate of still another structure.

A negative electrode current collector plate 3 of two-layer structure is prepared which comprises a copper layer 31 with a thickness of 2.40 mm and a nickel layer 32 with a thickness of 0.60 mm as shown in FIG. 2. Alternatively prepared is a negative electrode current collector plate 3 of two-layer structure comprising a stainless steel layer 35 as seen in FIG. 5, or a negative electrode current collector plate 3 of three-layer structure comprising a copper layer 31 with a thickness of 2.40 mm, a nickel layer 32 with a thickness of 0.30 mm and a stainless steel layer 39 having a thickness of 0.30 mm and sandwiched between these layers 31, 32 as seen in FIG. 6. A lead portion 33 of copper is joined at the base end thereof to an end portion of the collector plate 3. Further prepared is a positive electrode current collector plate 30 comprising an aluminum sheet with a thickness of 1.00 mm. A lead portion 34 of aluminum is joined at its base end to an end portion of the collector plate 30.

Assembly of Cell

The negative electrode current collector plate 3 is welded to the edge of the negative electrode 21 by positioning the collector plate 3 at one end of the electrode unit 2 with the copper layer 31 in contact with the edge of the negative electrode 21 of the unit 2 and irradiating the surface of the nickel layer 32 of the plate 3 with a laser beam. The positive electrode current collector plate 30 is welded to the edge of the positive electrode 23 of the electrode unit 2 by positioning the collector plate 30 at the edge of the positive electrode 23 and irradiating the surface of the collector plate 30 with a laser beam.

Subsequently, the outer end of the lead portion 33 extending from the collector plate 3 is joined to the flange 43 of terminal member 41 of a negative terminal assembly 4 by ultrasonic welding, and the outer end of the lead portion 34 extending from the positive collector plate 30 is joined to the flange 43 of terminal member 41 of a positive terminal assembly 4 by ultrasonic welding. The negative terminal assembly 4 and the positive terminal assembly 40 are mounted on respective lids 16, 16.

The rolled-up electrode unit 2 is inserted into a cylinder 15, the lids 16, 16 are welded to the open ends of the cylinder 15, and an electrolyte is thereafter poured into the cylinder through an unillustrated electrolyte inlet. The electrolyte is prepared by mixing ethylene carbonate and diethyl carbonate together in a volume ratio of 1:1 and dissolving $LiPF_6$ in the solvent mixture at a concentration of 1 mole/liter. The electrolyte inlet is eventually sealed off. In this way, a cylindrical lithium ion secondary cell is completed as shown in FIG. 1.

The positive electrode active material is not limited to $LiCoO_2$ mentioned above; also usable are $LiNiO_2$, $LiMn_2O_4$, etc. The negative electrode active material is not limited to natural graphite mentioned above; also usable are other carbon materials such as artificial graphite, coke, etc. and materials capable of absorbing and desorbing lithium. The electrolyte is not limited to the above-mentioned one; also usable are solutions having a concentration of 0.7 to 1.5 moles/liter and prepared by dissolving a solute, such as $LiClO_4$ or $LiCF_3SO_4$, in a solvent mixture of vinylidene carbonate, propylene carbonate or like organic solvent and dimethyl carbonate, diethyl carbonate, 1,2-dimethoxyethane, ethoxymethoxyethane or like low-boiling point solvent.

Experiment

Figure 7:
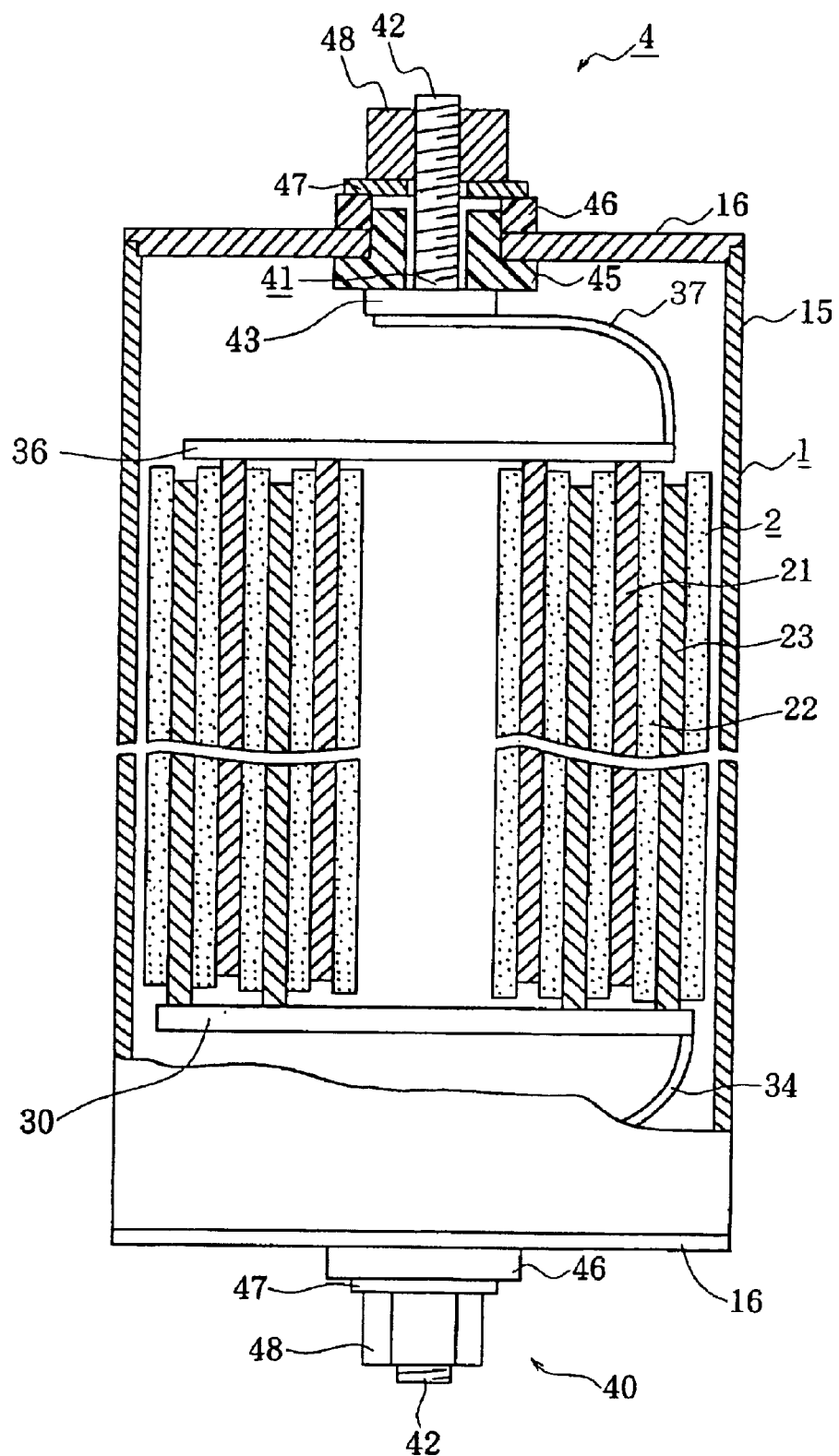
FIG. 7 is a view in section of a conventional cylindrical lithium ion secondary cell.

Invention cells 1 to 11 were fabricated which had the same construction as the cylindrical lithium ion secondary cell of the invention described above. These cells each had a negative electrode current collector plate 3 of two-layer structure as shown in FIG. 2 and made different in the thicknesses of the nickel layer 32 and copper layer 31. Also fabricated were invention cells 12 to 22 each of which had a negative electrode current collector plate 3 of two-layer structure as shown in FIG. 5 and which were made different in the thicknesses of the stainless steel layer 35 and copper layer 31. Further fabricated was invention cell 23 which had a negative electrode current collector plate 3 comprising three layers, i.e., a nickel layer 32, stainless steel layer 39 and copper layer 31 as shown in FIG. 6. On the other hand, comparative cells 1 and 2 were fabricated which had the same construction as the invention cells except that the negative electrode current collector plate had a single-layer structure comprising a nickel or copper plate as seen in FIG. 7. The cells were checked for power density. The stainless steel used was an austenitic stainless steel.

Tables 1 to 6 show the constructions of the cells.

TABLE 1

| CELL NO. | THICK-NESS OF Ni LAYER (mm) | THICK-NESS OF Cu LAYER (mm) | THICK-NESS OF NEGATIVE COLLEC-TOR PLATE (mm) | RATIO OF THICK-NESS OF Ni LAYER TO THICK-NESS OF COLLEC-TOR PLATE (%) |
|---|---|---|---|---|
| INVENTION CELL 1 | 0.02 | 0.07 | 0.09 | 22 |
| INVENTION CELL 2 | 0.02 | 0.08 | 0.10 | 20 |
| INVENTION CELL 3 | 0.20 | 0.80 | 1.00 | 20 |
| INVENTION CELL 4 | 0.60 | 2.40 | 3.00 | 20 |
| INVENTION CELL 5 | 1.00 | 4.00 | 5.00 | 20 |
| INVENTION CELL 6 | 1.10 | 4.40 | 5.50 | 20 |

TABLE 2

| CELL NO. | THICKNESS OF Ni LAYER (mm) | THICKNESS OF Cu LAYER (mm) | THICKNESS OF NEGATIVE COLLECTOR PLATE (mm) | RATIO OF THICKNESS OF Ni LAYER TO THICKNESS OF COLLECTOR PLATE (%) |
|---|---|---|---|---|
| INVENTION CELL 7 | 0.12 | 2.88 | 3.00 | 4 |
| INVENTION CELL 8 | 0.15 | 2.85 | 3.00 | 5 |
| INVENTION CELL 9 | 0.30 | 2.70 | 3.00 | 10 |
| INVENTION CELL 4 | 0.60 | 2.40 | 3.00 | 20 |
| INVENTION CELL 10 | 1.35 | 1.65 | 3.00 | 45 |
| INVENTION CELL 11 | 1.40 | 1.60 | 3.00 | 47 |

TABLE 3

| CELL NO. | THICKNESS OF STAINLESS STEEL LAYER (mm) | THICKNESS OF Cu LAYER (mm) | THICKNESS OF NEGATIVE COLLECTOR PLATE (mm) | RATIO OF THICKNESS OF STAINLESS STEEL LAYER TO THICKNESS OF COLLECTOR PLATE (%) |
|---|---|---|---|---|
| INVENTION CELL 12 | 0.02 | 0.07 | 0.09 | 22 |
| INVENTION CELL 13 | 0.02 | 0.08 | 0.10 | 20 |
| INVENTION CELL 14 | 0.20 | 0.80 | 1.00 | 20 |
| INVENTION CELL 15 | 0.60 | 2.40 | 3.00 | 20 |
| INVENTION CELL 16 | 1.00 | 4.00 | 5.00 | 20 |
| INVENTION CELL 17 | 1.10 | 4.40 | 5.50 | 20 |

TABLE 4

| CELL NO. | THICKNESS OF STAINLESS STEEL LAYER (mm) | THICKNESS OF Cu LAYER (mm) | THICKNESS OF NEGATIVE COLLECTOR PLATE (mm) | RATIO OF THICKNESS OF STAINLESS STEEL LAYER TO THICKNESS OF COLLECTOR PLATE (%) |
|---|---|---|---|---|
| INVENTION CELL 18 | 0.12 | 2.88 | 3.00 | 4 |
| INVENTION CELL 19 | 0.15 | 2.85 | 3.00 | 5 |
| INVENTION CELL 20 | 0.30 | 2.70 | 3.00 | 10 |
| INVENTION CELL 15 | 0.60 | 2.40 | 3.00 | 20 |
| INVENTION CELL 21 | 1.35 | 1.65 | 3.00 | 45 |
| INVENTION CELL 22 | 1.40 | 1.60 | 3.00 | 47 |

TABLE 5

| CELL NO. | THICKNESS OF Ni LAYER (mm) | THICKNESS OF STAINLESS STEEL LAYER (mm) | THICKNESS of Cu LAYER (mm) | THICKNESS OF NEGATIVE COLLECTOR PLATE (mm) | RATIO OF THICKNESS OF STAINLESS STEEL LAYER + Ni LAYER TO THICKNESS OF OF COLLECTOR PLATE (%) |
|---|---|---|---|---|---|
| INVENTION CELL 23 | 0.30 | 0.30 | 2.40 | 3.00 | 20 |

TABLE 6

| CELL NO. | THICKNESS OF Ni LAYER (mm) | THICKNESS OF Cu LAYER (mm) | THICKNESS OF NEGATIVE COLLECTOR PLATE (mm) |
|---|---|---|---|
| COMP. CELL 1 | 0.00 | 3.00 | 3.00 |
| COMP. CELL 2 | 3.00 | 0.00 | 3.00 |

The cells were discharged at different current values at a depth of discharge of 50% for 10 seconds. The power density of each cell was determined from the relationship between the cell voltage as measured 10 seconds after the discharge and the current value measured at the same time. Tables 7 to 9 show the results.

TABLE 7

| CELL NO. | POWER DENSITY (W/kg) |
|---|---|
| INVENTION CELL 1 | 802 |
| INVENTION CELL 2 | 912 |
| INVENTION CELL 3 | 947 |
| INVENTION CELL 4 | 973 |
| INVENTION CELL 5 | 935 |
| INVENTION CELL 6 | 871 |
| INVENTION CELL 7 | 832 |
| INVENTION CELL 8 | 909 |
| INVENTION CELL 9 | 927 |
| INVENTION CELL 10 | 934 |
| INVENTION CELL 11 | 853 |
| COMP. CELL 1 | 735 |
| COMP. CELL 2 | 786 |

TABLE 8

| CELL NO. | POWER DENSITY (W/kg) |
|---|---|
| INVENTION CELL 12 | 800 |
| INVENTION CELL 13 | 895 |
| INVENTION CELL 14 | 914 |
| INVENTION CELL 15 | 927 |
| INVENTION CELL 16 | 899 |
| INVENTION CELL 17 | 843 |
| INVENTION CELL 18 | 810 |
| INVENTION CELL 19 | 894 |
| INVENTION CELL 20 | 900 |
| INVENTION CELL 21 | 899 |

TABLE 8-continued

| CELL NO. | POWER DENSITY (W/kg) |
|---|---|
| INVENTION CELL 22 | 831 |
| COMP. CELL 1 | 735 |
| COMP. CELL 2 | 786 |

TABLE 9

| CELL NO. | POWER DENSITY (W/kg) |
|---|---|
| INVENTION CELL 23 | 931 |
| COMP. CELL 1 | 735 |
| COMP. CELL 2 | 786 |

Tables 7 and 8 reveal that invention cells 1 to 11 and 12 to 22 are higher than comparative cells 1 and 2 in power density. This is attributable to the fact that these invention cells include the current collector plate 3 which had a two-layer structure, i.e., copper layer 31, and nickel layer 32 or stainless steel layer 35, and which suppressed the reflection of the laser beam used for welding the plate 3 to the rolled-up electrode unit 2 and was therefore reliably welded to the edge of the negative electrode 21 to result in an improved current collecting efficiency.

With comparative cell 1, on the other hand, the laser beam was reflected by the surface of the negative electrode current collector plate of copper, failing to completely weld the plate and leading to a lower current collecting efficiency. With comparative cell 2, increased electric resistance of the nickel collector plate led to a reduced current collecting efficiency.

Invention cells 2 to 5 and 13 to 16 which are in the range of 0.10 mm to 5.00 mm in the overall thickness of the negative electrode current collector plate 3 are greater in power density than invention cells 1, 6, 12 and 17 which are outside this range. This is because when the thickness of the plate 3 becomes smaller than 0.10 mm, the electric resistance of the collector plate 3 itself increases, consequently entailing a reduced current collecting efficiency, and further because if the thickness of the collector plate 3 is in excess of 5.00 mm, an unsatisfactory weld will result to entail a lower current collecting efficiency.

Further invention cells 4 and 8 to 10 wherein the ratio of the thickness of the nickel layer 32 to the thickness of the current collector plate 3 is in the range of 5% to 45% are greater in power density than invention cells 7 and 11 wherein the ratio is outside this range. Similarly, invention cells 15 and 19 to 21 wherein the ratio of the thickness of the stainless steel layer 35 to the thickness of the current collector plate 3 is in the range of 5% to 45% are greater in power density than invention cells 18 and 22 wherein the ratio is outside this range. The reason is that if the ratio of the thickness of the nickel layer 32 or stainless steel layer 35 is smaller than 5%, the surface of the copper layer 31 appears immediately after the start of welding of the collector plate 3, resulting in increased laser beam reflectivity and insufficient welding to entail a lower current collecting efficiency, and that the ratio of the thickness of the nickel layer 32 or stainless steel layer 35, if in excess of 45%, increases the electric resistance of the collector plate 3 to result in a reduced current collecting efficiency.

Table 9 further reveals that invention cell 23 is higher than comparative cells 1 and 2 in power density. This indicates that the same effect as above is available by using the negative electrode current collector plate 3 of three-layer structure wherein the stainless steel layer 39 is interposed between the nickel layer 32 and the copper layer 31.

The results described indicate that the provision of the collector plate 3 comprising the copper layer 31, and the nickel layer 32 or stainless steel layer 35 affords an improved current collecting efficiency, consequently giving an increased power density. It can be said that the thickness of the negative electrode current collector plate 3 is preferably in the range of 0.10 mm to 5.00 mm, and that the ratio of the thickness of the nickel layer 32 or stainless steel layer 35 to the overall thickness of the collector plate 3 is preferably 5% to 45%. It is also apparent that if the values are within these ranges, the collector plate 3 can be composed of at least two layers.

[2] Second Embodiment

Figure 8:
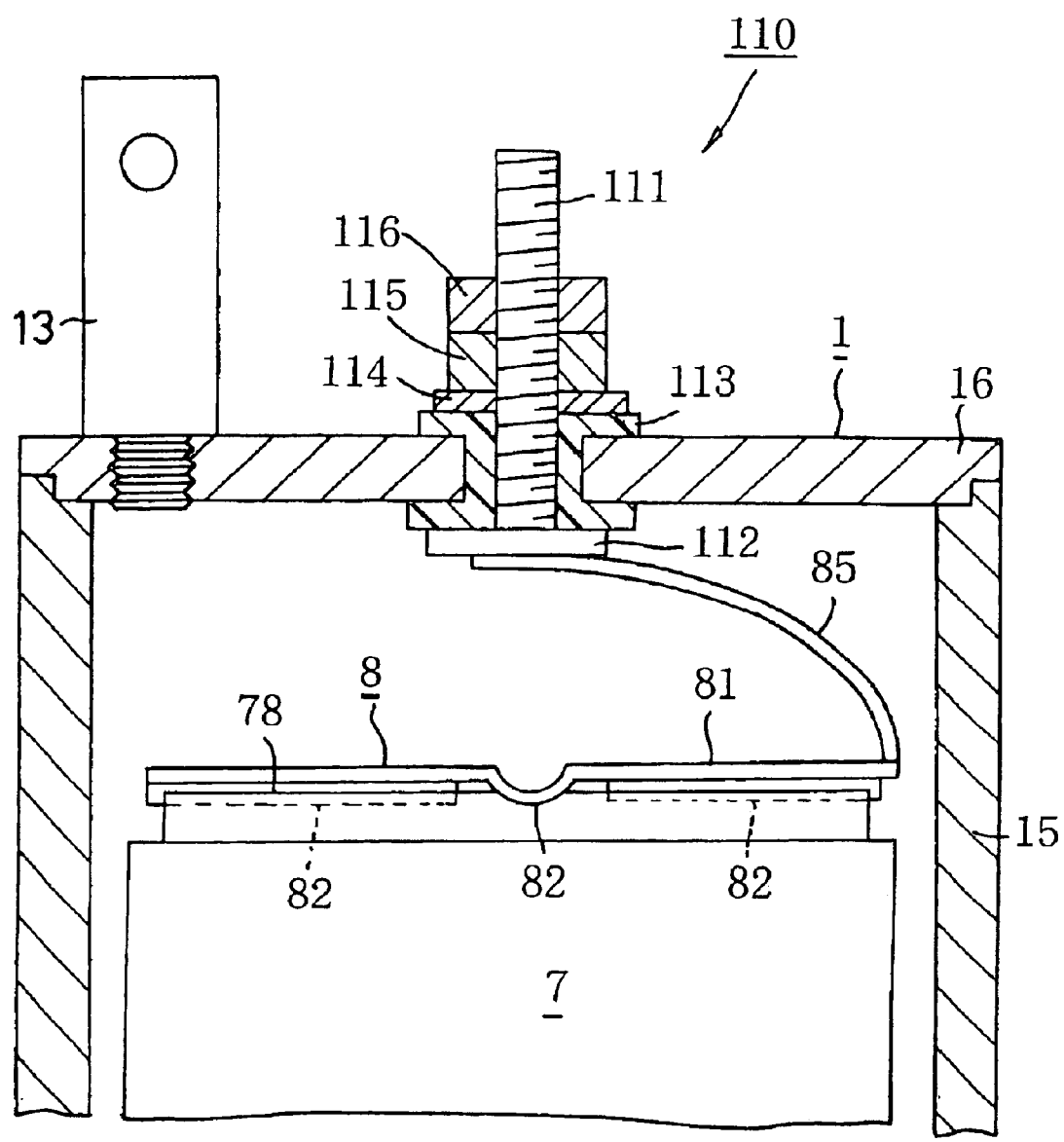
FIG. 8 is a fragmentary front view partly broken away and showing a lithium ion secondary cell embodying the invention.

FIG. 8 shows this embodiment, i.e., a cylindrical lithium ion secondary cell, which comprises a cylindrical battery can 1 formed by fixedly welding lids 16, 16, to opposite ends of a cylinder 15, and a rolled-up electrode unit 7 encased in the can 1. A pair of positive and negative electrode terminal assemblies 110, 110 are mounted on the respective lids 16, 16. The terminal assemblies 110 have the same construction as those of the prior art. Each lid 16 is provided with a gas vent valve 13 which is openable with pressure.

A current collector plate 8 is disposed at each of opposite ends of the electrode unit 7 and joined to a current collector edge 78 by laser welding. A lead portion 85 extending from an end portion of the collector plate 8 has an outer end joined to a flange 112 of an electrode terminal 111 constituting the terminal assembly 110 by spot welding, ultrasonic welding or laser welding.

Rolled-up Electrode Unit 7

Figure 9:
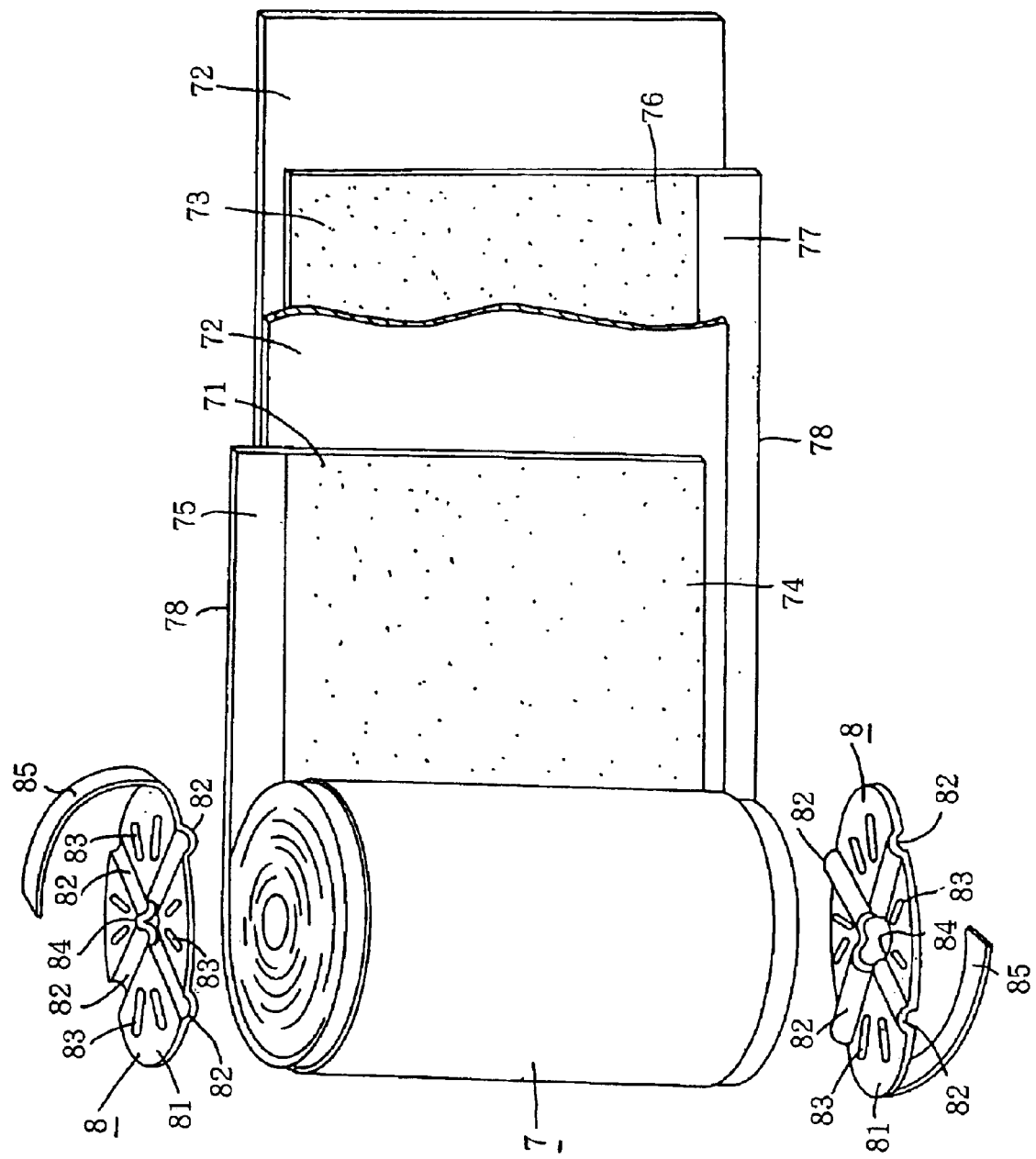
FIG. 9 is an exploded perspective view of a rolled-up electrode unit and a current collector plate.

As shown in FIG. 9, the rolled-up electrode unit 7 comprises a positive electrode 71 and a negative electrode 73, which are each in the form of a strip, and a striplike separator 72 sandwiched between these electrodes, and is prepared by rolling up these components into a spiral form. The positive electrode 71 is formed by coating opposite surfaces of a current collector 75 in the form of a strip of aluminum foil with a positive electrode active material 74 comprising a compound oxide. The negative electrode 73 is formed by coating opposite surfaces of a current collector 77 in the form of a strip of copper foil with a negative electrode active material 76 containing a carbon material. The separator 72 is impregnated with a nonaqueous electrolyte.

The positive electrode 71 has a portion coated with the positive electrode active material 74, and a portion not coated with the active material. The negative electrode 73 also has a portion coated with the negative electrode active material 76, and a portion not coated with the active material.

The positive electrode 71 and the negative electrode 73 are each superposed on the separator 72 as displaced widthwise thereof to position the uncoated portions of the positive electrode 71 and the negative electrode 73 as projected outward beyond the respective edges of the separator 72. The components are rolled up into a spiral form to obtain an electrode unit 7. In this rolled-up electrode unit 7, the current collector edge 78 of uncoated portion of the positive electrode 71 is positioned as projected outward beyond one edge of the separator 72 at one of opposite ends of the electrode unit 7 in the direction of its winding axis, and the current collector edge 78 of uncoated portion of the negative electrode 73 is positioned as projected outward beyond the other edge of the separator 72 at the other end of the unit 7.

Current Collecting Structure

Figure 10:
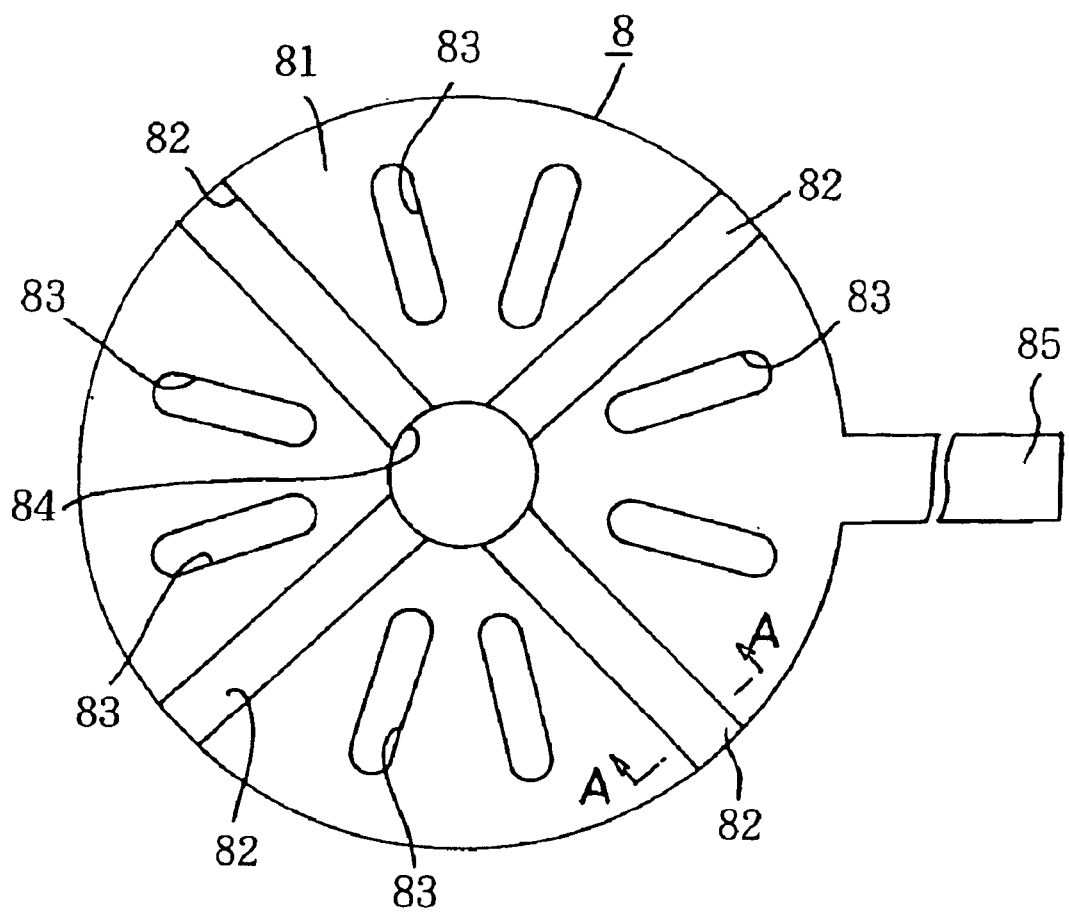
FIG. 10 is a plane view of the collector plate.

FIGS. 9 and 10 show a current collector plate 8 which comprises a circular flat platelike body 81 integrally formed with a plurality of circular-arc protrusions 82 extending radially thereof and projecting toward the rolled-up electrode unit 7. The collector body 81 has a center hole 84 and a plurality of liquid inlets 83 around the center hole 84. The aforementioned lead portion 85, which is in the form of a strip, is integral with an end portion of the collector body 81.

Figure 11:
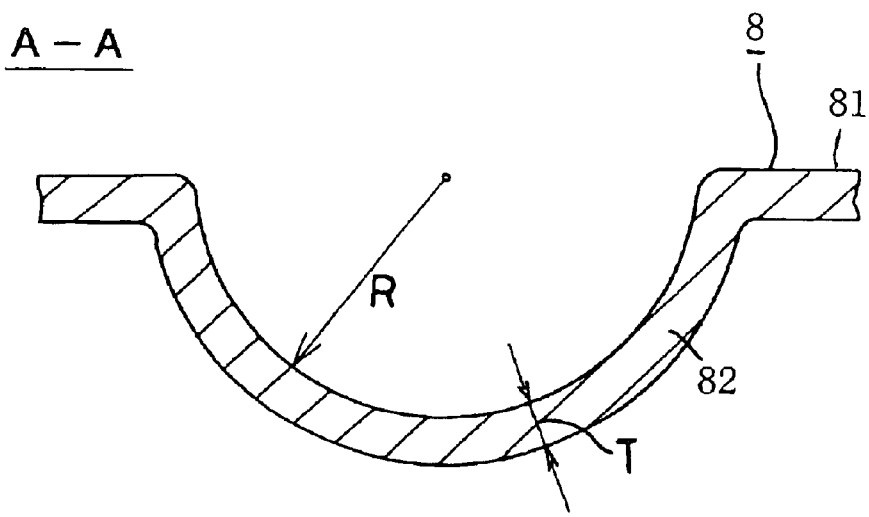
FIG. 11 is an enlarged view in section taken along the line A—A in FIG. 10.

Each protrusion 82 of the collector plate 8 is in the form of a circular arc, i.e., semicircular, in section orthgonal to a radial line of the collector body 81 as seen in FIG. 11.

Other Current Collecting Structure

Figure 16:
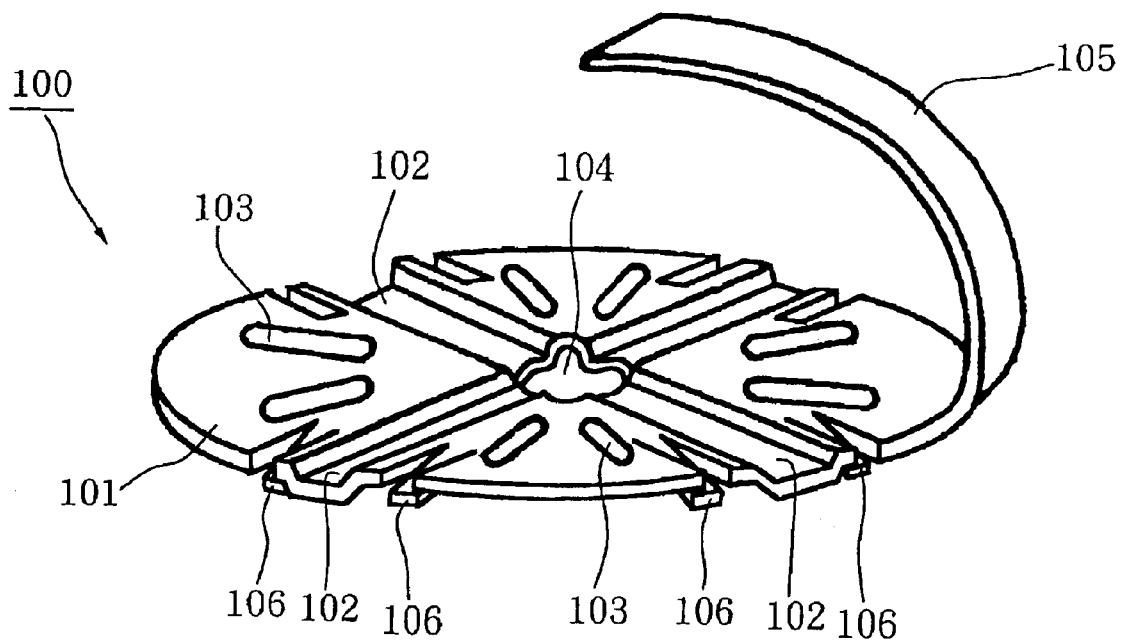
FIG. 16 is a perspective view of a negative electrode current collector plate of another structure.
Figure 17:
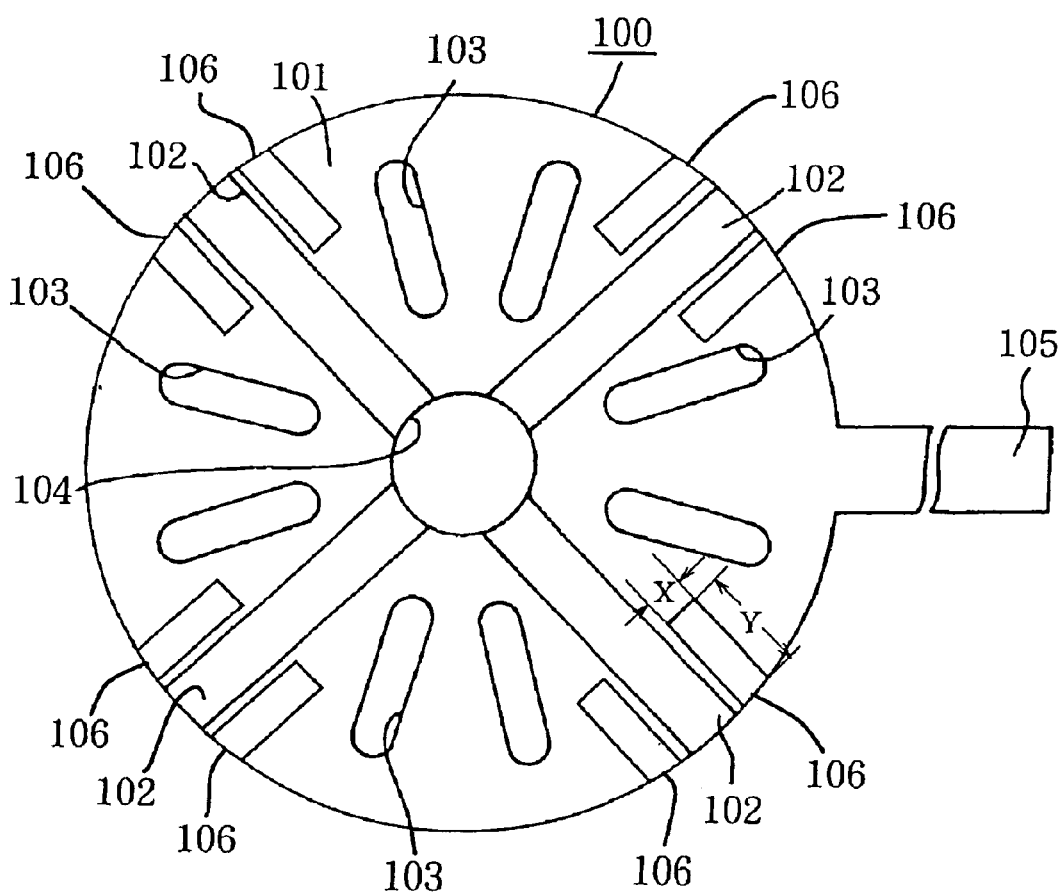
FIG. 17 is a plane view of the collector plate.

FIGS. 16 and 17 show a current collector plate 100 having a different construction. The collector plate 100 comprises a circular flat platelike body 101 integrally formed with a plurality of trapezoidal protrusions 102 extending radially thereof and projecting toward the rolled-up electrode unit 7. The collector body 101 has a center hole 104 and a plurality of liquid inlets 103 around the center hole 104. A lead portion 105 in the form of a strip is integral with an end portion of the collector body 101.

The collector body 101 is further provided along its outer periphery with a current collector pressing portion 106 projecting downward and positioned close to each of opposite sides of the protrusion 102 for pressing the outer end of the current collector 77 of the electrode unit 7 inwardly of the unit 7. The current collector pressing portion 106 is formed by cutting and bending an outer peripheral portion of the collector body 101 to the shape of a strip measuring 2 mm in width X and 5 mm in length Y as shown in FIG. 17.

Fabrication Process

Figure 12:
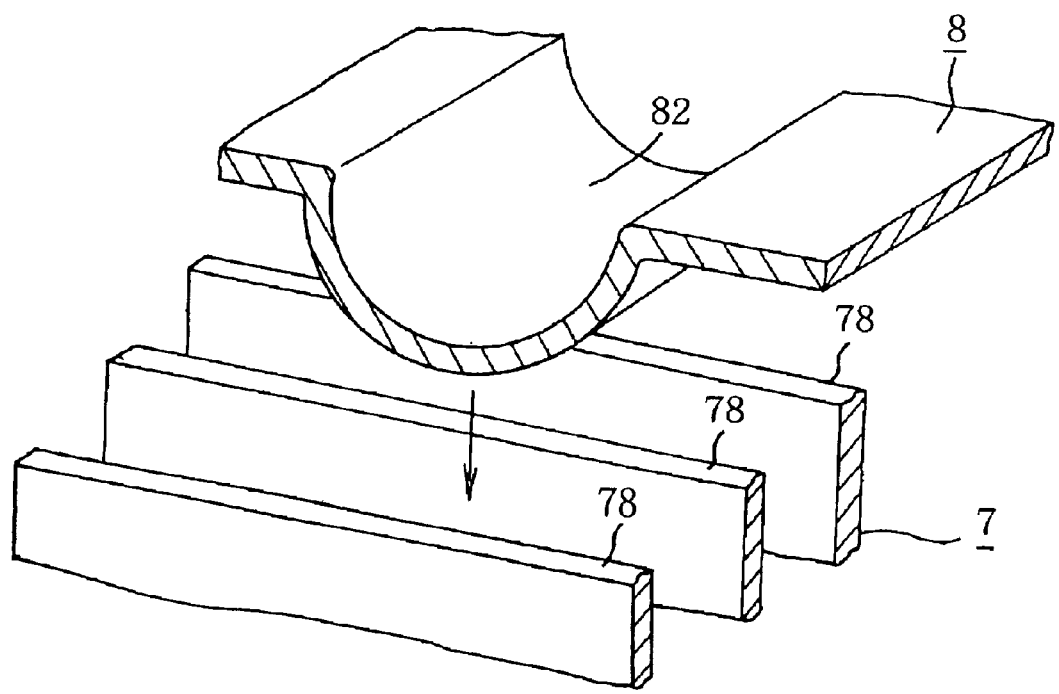
FIG. 12 is a perspective view showing the step of pressing the collector plate against the rolled-up electrode unit.

Prepared first are a battery can 1 and electrode terminal assemblies 110 which are shown in FIG. 8, and a rolled-up electrode unit 7 and current collector plates 8 which are shown in FIG. 9. The collector plates 8 are then pressed against the current collector edges 78 at the respective ends of the electrode unit 7 as shown in FIG. 12.

Figure 13:
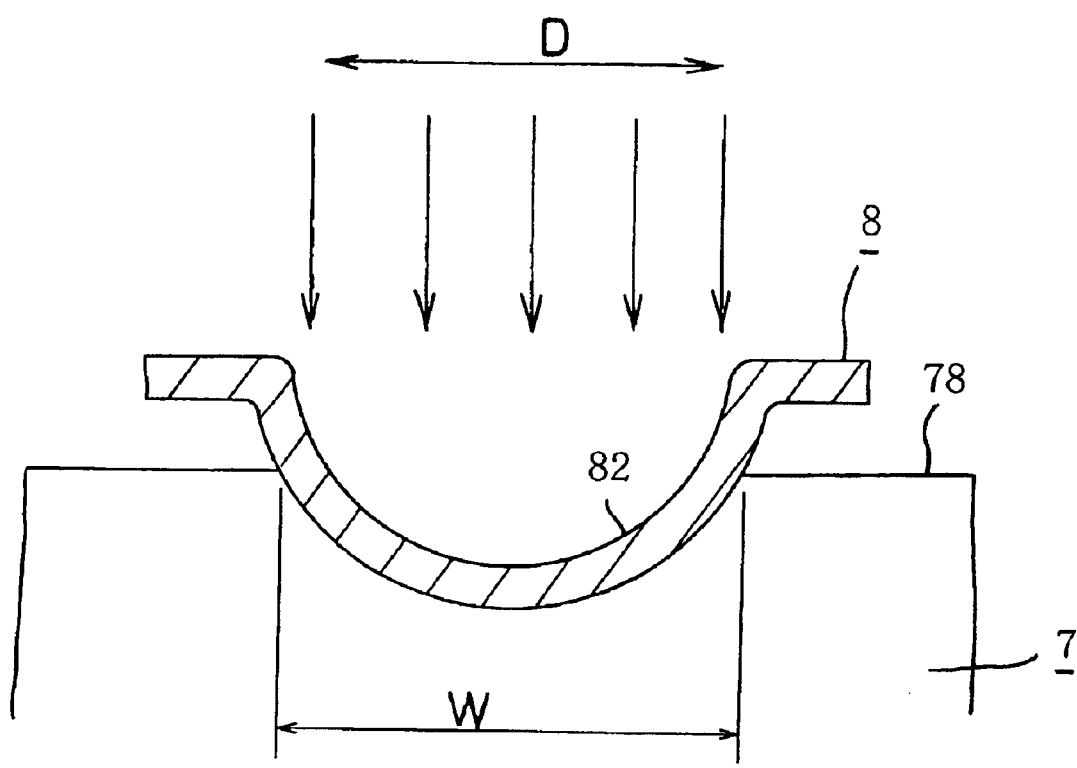
FIG. 13 is a sectional view showing a circular-arc protrusion of the collector plate as forced into a current collector edge.

This forces each circular-arc protrusion 82 of the collector plate 8 into the current collector edge 78 of the electrode unit 7 as shown in FIG. 13, forming a cylindrical junction between the protrusion 82 and the current collector edge 78.

In this state, a laser beam is projected onto the inner surface of the protrusion 82 of the plate 8 for laser welding as indicated by an arrow in the drawing. Consequently, the protrusion 82 of the collector plate 8 and the current collector edge 78 of the electrode unit 7 are joined to each other over a large area of contact.

Figure 18:
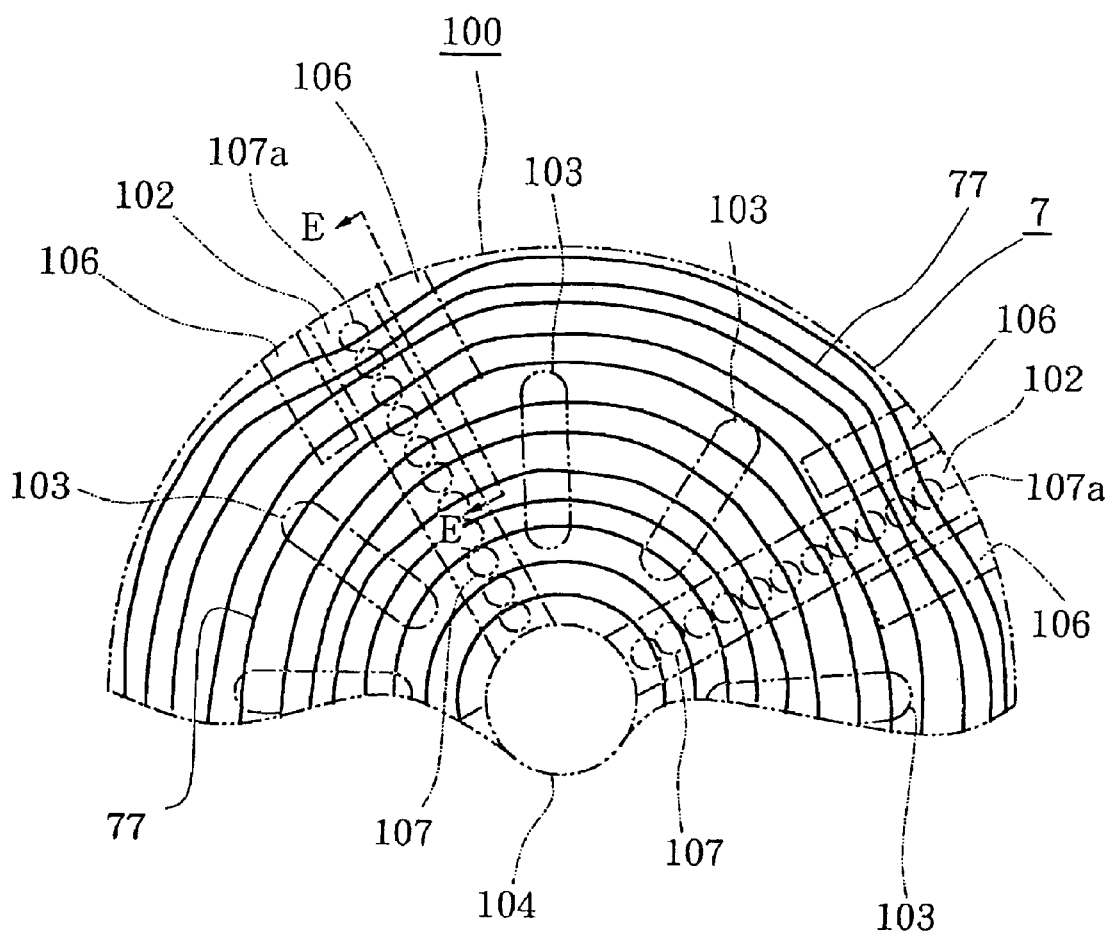
FIG. 18 is a plane view for illustrating the position of a laser beam spot on the collector plate.
Figure 19:
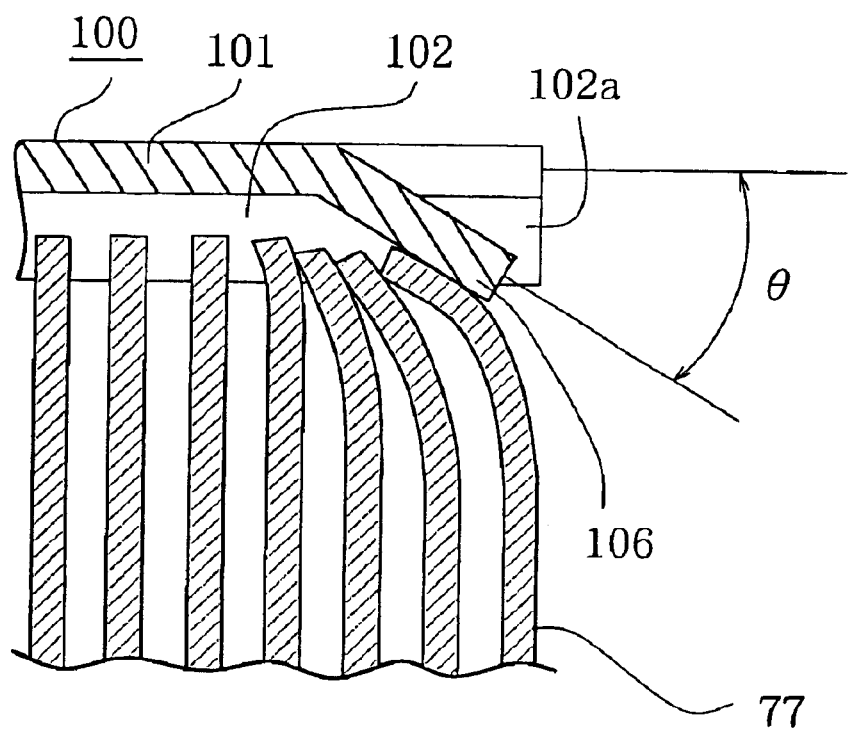
FIG. 19 is a view in section taken along the line E—E in FIG. 18.
Figure 20:
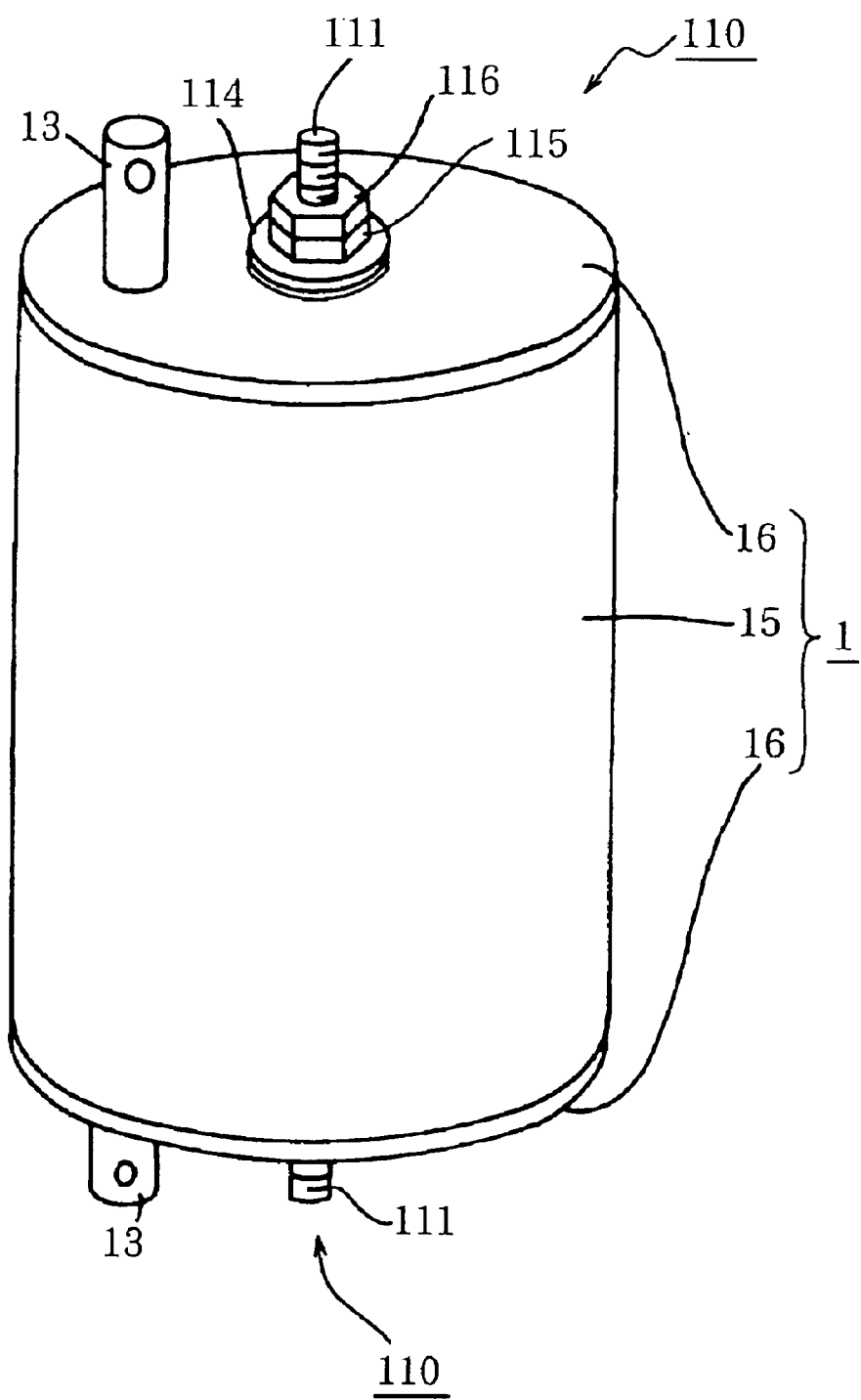
FIG. 20 is a perspective view showing the appearance of another conventional cylindrical lithium ion secondary cell.
Figure 21:
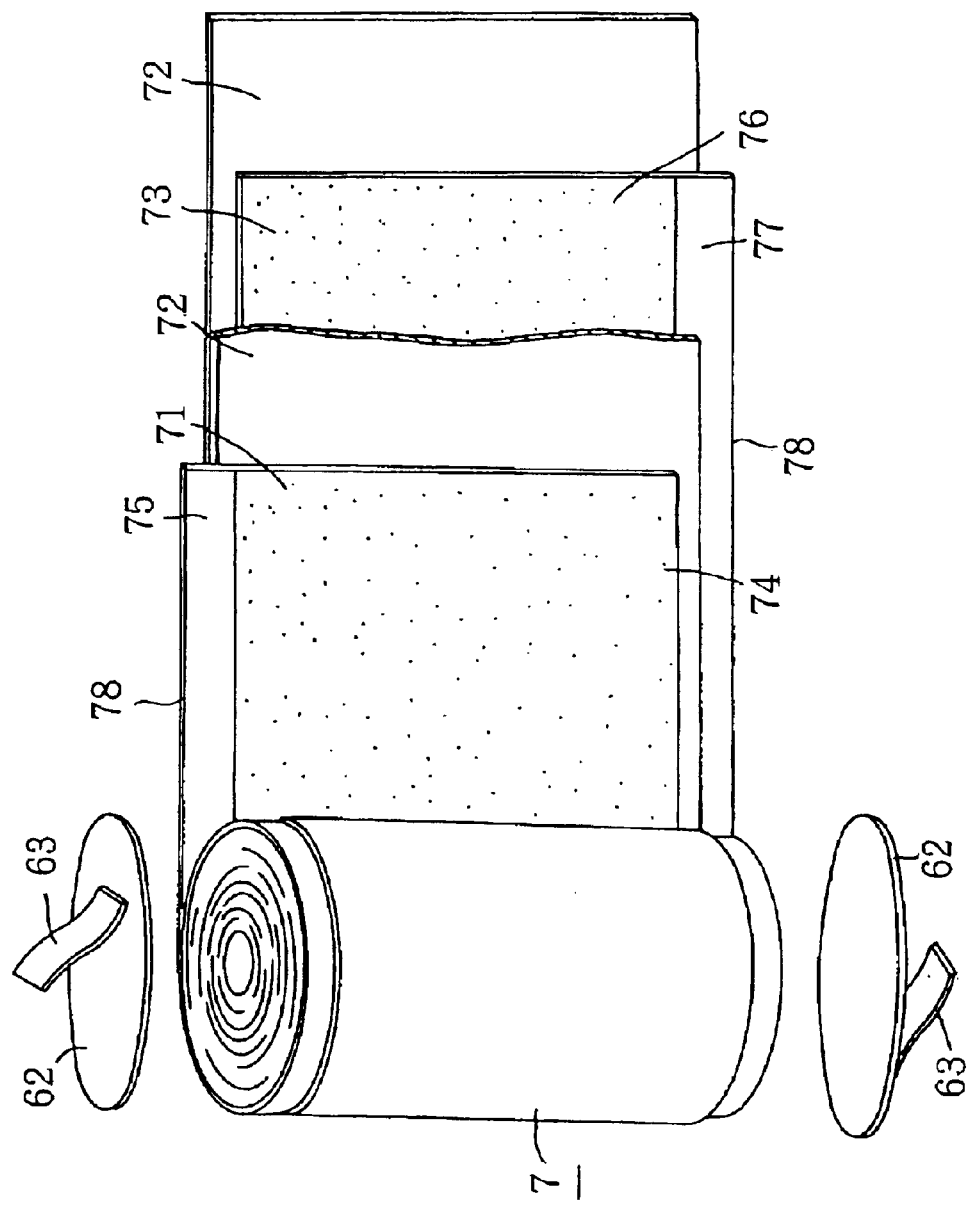
FIG. 21 is an exploded perspective view of a current collector plate and a rolled-up electrode unit.
Figure 22:
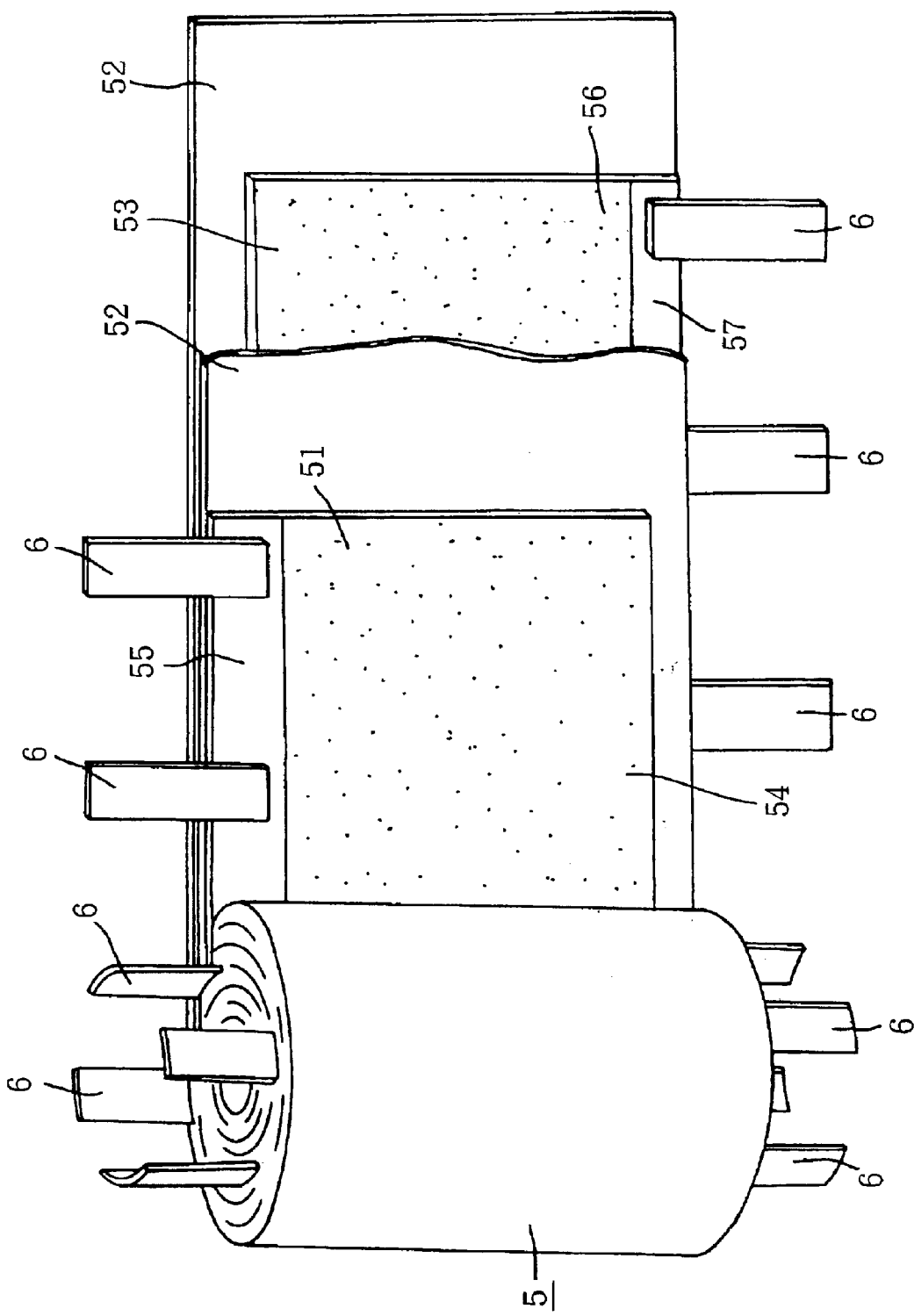
FIG. 22 is a perspective view partly in development and showing the rolled-up electrode unit used in the conventional lithium ion secondary cell.
Figure 23:
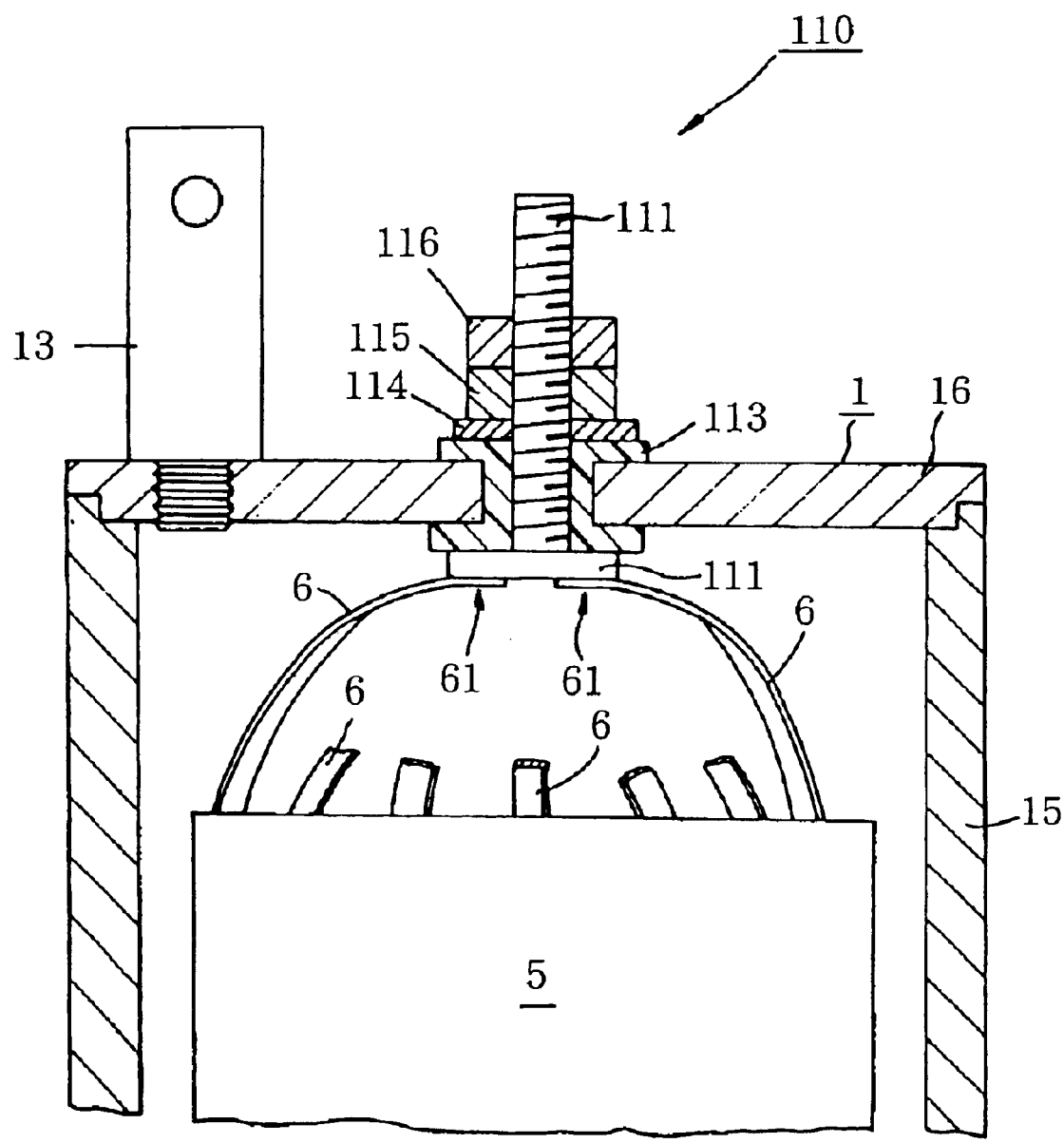
FIG. 23 is a fragmentary front view partly broken away and showing the conventional cell.

In the case where the current collector plate 100 shown in FIGS. 18 and 19 is used, the collector plate 100 is pressed against the end of the rolled-up electrode unit 7, whereby the corresponding end of the current collector 77 is deflected inwardly of the unit 7 by being pressed by the current collector pressing portion 106. This shifts the position of contact between the current collector end and the protrusion 102 of the collector plate 100 also inwardly of the electrode unit 7. On the other hand, when the collector plate 100 is welded to the end of the electrode unit 7 with a laser beam, the laser beam is moved, for example, from the inner peripheral side of the plate 100 toward the outer periphery thereof along the protrusion 102 of the plate 100 as indicated in two-dot chain lines in FIG. 18 to show the path of movement of the beam spot 107. The spot 107a as positioned most radially outwardly of the collector plate 100 can be confined to an area slightly inwardly of the radial outer end 102a of the protrusion 102 of the plate 100 due to the deflection of the end portion of the current collector 77. Suppose the outermost spot 107a is positioned at the radial outer end 102a of the collector plate protrusion 102. The laser beam is then partly projected outwardly of the outer periphery of the collector plate 100, possibly melting the outermost portion of the current collector 77 or separator 72 of the electrode unit 7. With the structure shown in FIGS. 18 and 19, in contrast, the outermost spot 107a will not be positioned outside the outer periphery of the collector plate 100. This eliminates the likelihood of the laser beam melting the current collector 77 or separator 72, consequently assuring that the collector plate 100 will be reliably welded even to the radially outermost portion of the current collector 77 of the unit 7 like the other portions thereof and permitting the plate 100 to be joined to the electrode unit 7 over an increased area to achieve an improved current collecting efficiency.

Assembly of Cells

Invention cells A, B, C, D, E and comparative cells F, G, H, I were fabricated in the following manner.

For invention cell A, a rolled-up electrode unit 7 was prepared by arranging in superposed layers a positive electrode 71 obtained by coating an aluminum current collector 75 having a thickness of 20 $\mu$m with a positive electrode active material 74 comprising $LiCo_2$, a negative electrode 73 obtained by coating a copper current collector 77 having a thickness of 20 $\mu$m with a negative electrode active material 76 of graphite and a separator 72 in the form of an ion-permeable finely porous membrane of polypropylene, and rolling up these components into a spiral form. The positive electrode 71 and the negative electrode 73 each had an uncoated portion of predetermined width at a widthwise end thereof.

A current collector plate 8 of aluminum was prepared which comprised a flat platelike body 81 having a thickness of 1 mm and a plurality of circular-arc radial protrusions 82 and formed with a plurality of liquid inlets 83 in an opening ratio of 50%. The collector plate 8 was fitted over the positive electrode current collector edge 78 of the electrode unit 7 and pressed thereagainst with a jig from above. The circular-arc protrusions 82 of the collector plate 8 were 1 mm in wall thickness T and 1.2 mm in inside radius R.

In this state, a laser beam was projected onto the inner surface of each protrusion 82 of the plate 8 as shown in FIG. 13 to weld the outer peripheral surface of the protrusion 82 to the current collector edge 78. A current collecting structure for the positive electrode was then made by welding the base end of an aluminum lead piece, 1 mm in thickness, to the surface of the collector plate 8 with a laser beam, and similarly welding the outer end of the lead piece to the rear face of an aluminum electrode terminal. A negative electrode current collecting structure was prepared in the same manner as above except that the electrode terminal, current collector plate and lead piece used were made from nickel.

The rolled-up electrode unit 7 was thereafter encased in a cylinder 15, and a lid 16 having an electrode terminal assembly 110 mounted thereon is fixedly welded to each open end of the cylinder 15. An ester-type organic electrolyte containing 1 mole/liter of $LiPF_6$ serving as the electrolytic substance to be supported was subsequently placed into the cylinder to fabricate a cell having a power capacity of 180-Wh class as a component cell.

Figure 15:
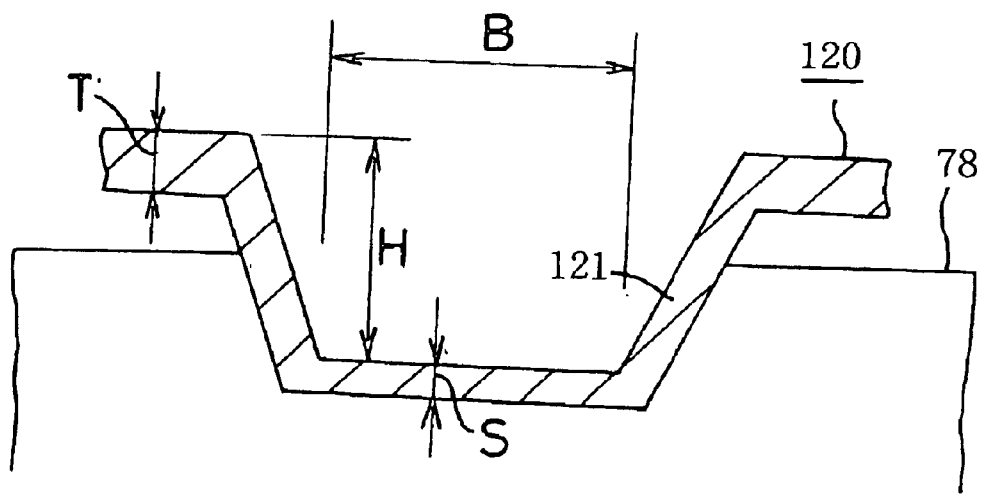
FIG. 15 is a sectional view showing a trapezoidal protrusion of a current collector plate as forced into a current collector edge.

Invention cells B were assembled in the same manner as invention cell A with the exception of using current collector plates 120 having protrusions 121 which were trapezoidal in section as shown in FIG. 15. Seven kinds of cells B, i.e., cells B1 to B7, were prepared which were 10%, 15%, 30%, 50%, 70%, 90% and 93%, respectively, in the opening ratio given by liquid inlets. The furrow forming each trapezoidal protrusion 121 was 1.2 mm in depth H and 1.6 mm in furrow width B at the furrow bottom.

Invention cell C was assembled in the same manner as invention cells B except that the flat collector body was integrally formed with a lead portion having the same thickness as the collector body. The opening ratio given by the liquid inlets was 50%. The outer end of the lead portion was welded to the rear face of the electrode terminal with a laser beam.

Invention cells D, i.e., 23 kinds of invention cells D1 to D23, were assembled basically in the same manner as invention cell C except that the cells were different in the shape and size of the furrow forming the trapezoidal protrusion as will be described below. The area of openings was 50% of the overall area.

Invention cells D1 to D5 were 0.6 times, 0.8 times, 1.0 times, 1.2 times and 1.6 times the laser spot diameter, respectively, in the furrow width B at the furrow bottom. Invention cells D6 to D14 were 0.3 mm, 0.5 mm, 0.8 mm, 1.2 mm, 1.6 mm, 2.0 mm, 2.5 mm, 3.0 mm and 3.5 mm, respectively, in furrow depth H. Further invention cells D15 to D23 were 0.05 mm, 0.10 mm, 0.20 mm, 0.50 mm, 1.00 mm, 1.50 mm, 2.00 mm, 2.50 mm and 3.00 mm, respectively, in the thickness T of the current collector plate.

Invention cells D1 to D5 were 1 mm in the thickness T of the current collector plate, 1.2 mm in the furrow depth H of the protrusion and 1 mm in the wall thickness S of the protrusion. Invention cells D6 to D14 were 1 mm in the thickness T of the current collector plate, 1.6 mm in the furrow width B of the protrusion and 1 mm in the wall thickness S of the protrusion. Invention cells D15 to D23 had a protrusion wall thickness S which was equal to the thickness T of the current collector plate, and were 1.6 mm in the furrow width B of the protrusion and 1.2 mm in the furrow depth H of the protrusion.

Invention cell E was assembled in the same manner as invention cell D except that the cell had current collector plates 120 as shown in FIG. 15 and measuring 1 mm in thickness T and 0.5 mm in the wall thickness S of the trapezoidal protrusion 121. The opening ratio given by the liquid inlets was 50%. The furrow depth H of the protrusion was 1.2 mm and the furrow width B at the furrow bottom of the protrusion was 1.6 mm.

Figure 24:
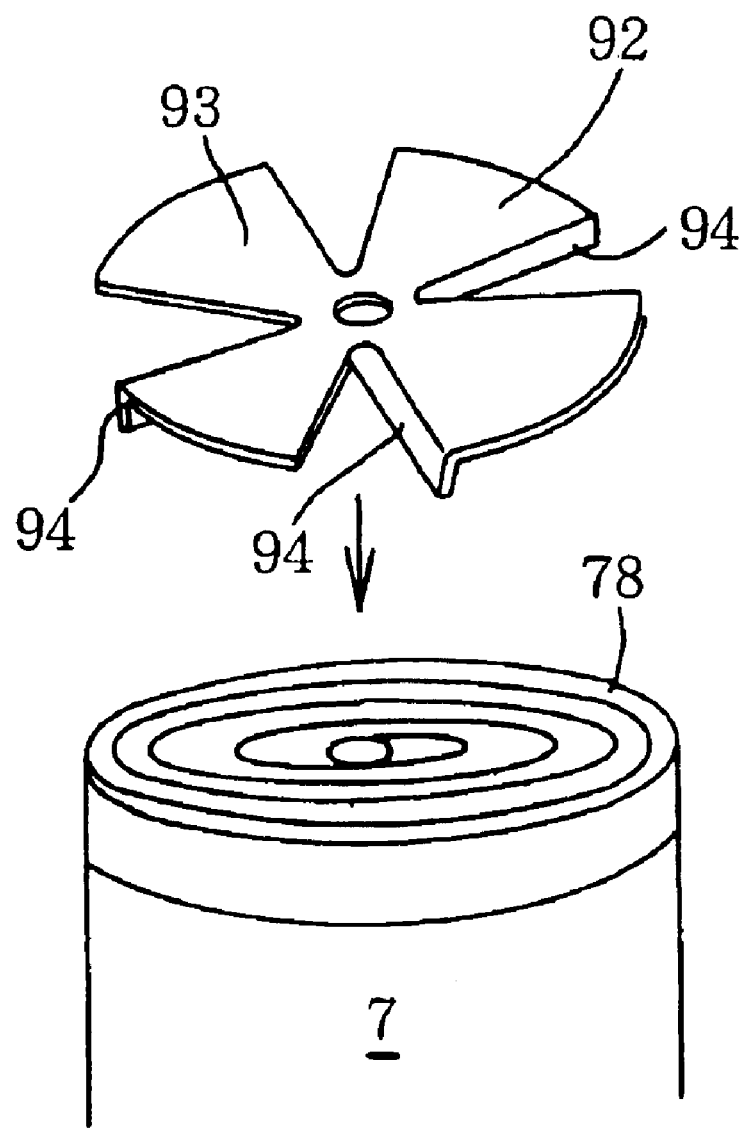
FIG. 24 is an exploded perspective view showing a current collector plate and a rolled-up electrode unit of the prior art.

To fabricate comparative cell F, on the other hand, current collector plates 92 were prepared which comprised a flat platelike body 93 having a thickness of 1 mm and four bent portions 94 as shown in FIG. 24. Each collector plate 92 was placed at the current collector edge 78 of a rolled-up electrode unit 7 and joined thereto by spot welding using two electrode rods. A lead was joined at opposite ends thereof to the collector plate 92 and an electrode terminal by spot welding to provide a current collecting structure, and the components were assembled into a cell in the same manner as above.

Figure 25:
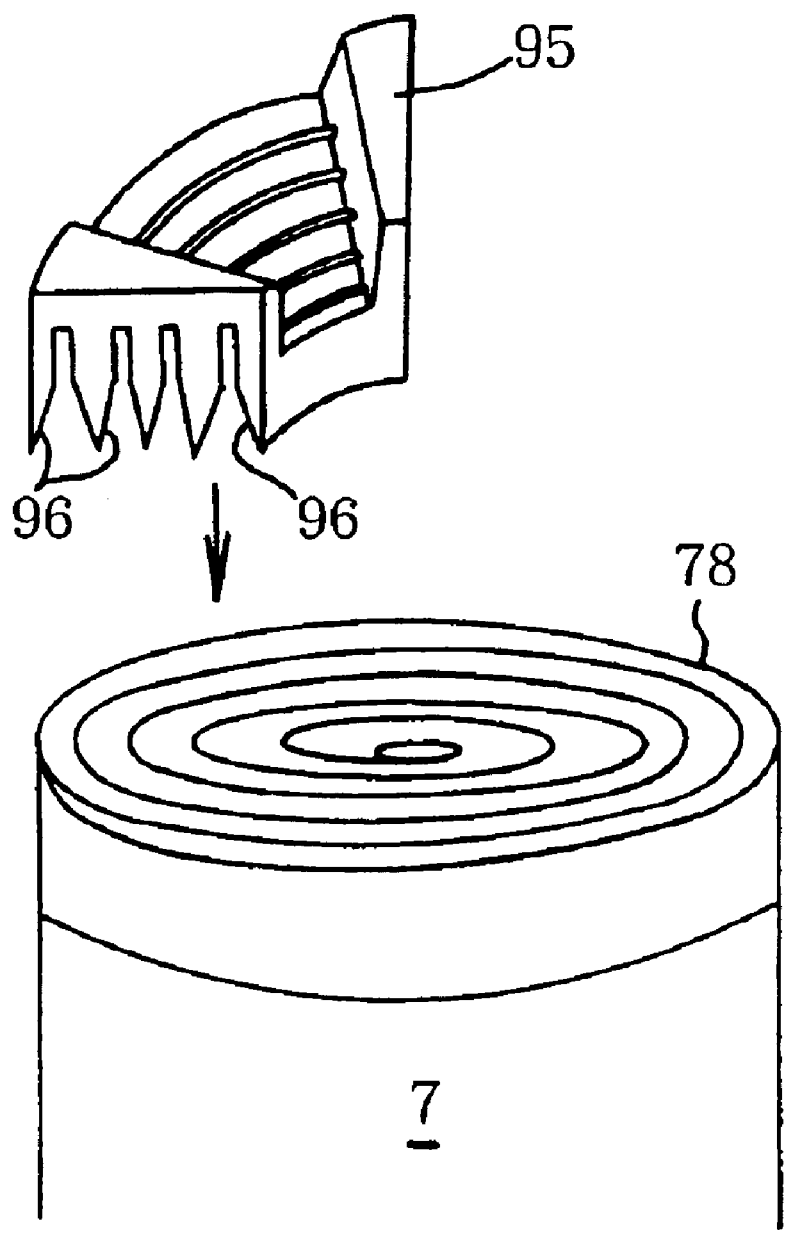
FIG. 25 is an exploded perspective view showing other current collector plate and rolled-up electrode unit of the prior art.

For comparative cell G, current collector members 95 were prepared which had a plurality of slits 96 as shown in FIG. 25. The current collector edge 78 of a rolled-up electrode unit 7 was inserted into the slits 96 of each collector member 95, which was joined to the current collector edge 78 by laser welding. A lead was joined at opposite ends thereof to the collector member 95 and an electrode terminal by laser welding to provide a current collecting structure, and the components were assembled into a cell in the same manner as above.

Figure 14:
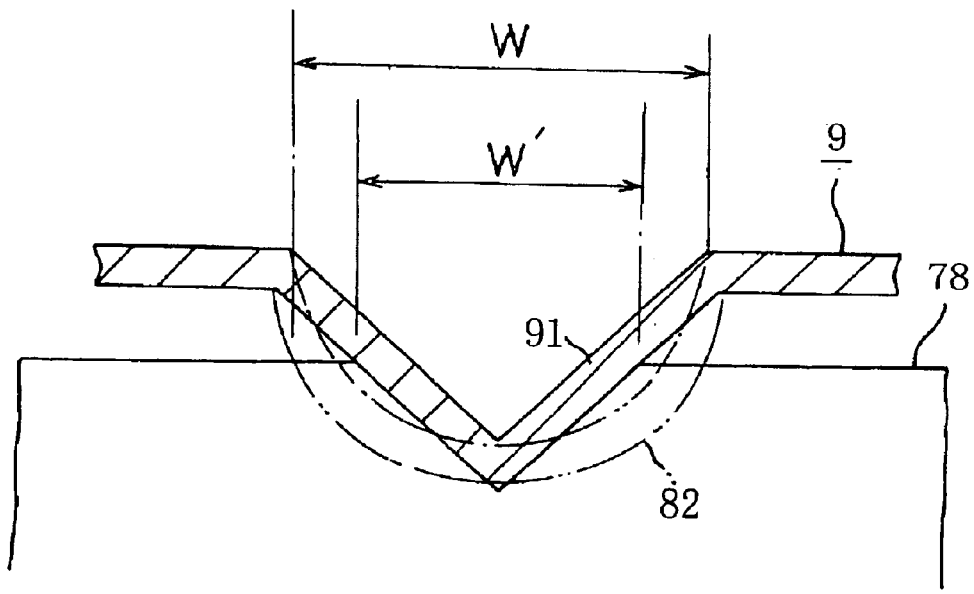
FIG. 14 is a sectional view showing a V-shaped protrusion of a current collector plate as forced into a current collector edge.

To fabricate comparative cell H, a current collector plate 9 of aluminum having a thickness of 1 mm and protrusions 91 V-shaped in section and having an end angle of 450 was pressed against the edge 78 of a positive electrode current collector of aluminum having a thickness of 20 μm and included in a rolled-up electrode unit as shown in FIG. 14. Each V-shaped protrusion 91 was irradiated with a laser beam in this state for laser welding. An aluminum lead, 1 mm in thickness, was thereafter joined at opposite ends thereof to the collector plate 9 and an electrode terminal to provide a current collecting structure for the positive electrode.

A negative electrode current collecting structure was prepared in the same manner as the structure for the positive electrode except that the electrode terminal, lead and current collector plate were made from nickel.

Invention cells I were assembled in the same manner as invention cell D with the exception of using current collector plates 100 having protrusion 102 of trapezoidal section as seen in FIGS. 16 and 17. Each plate 100 was 1 mm in thickness T, 1.2 mm in the furrow depth H of the protrusion, 0.5 mm in the wall thickness S of the protrusion, 1.6 mm in the furrow width B of the protrusion, 50% in the opening ratio given by the liquid inlets 103, 2 mm in the width X of the current collector pressing portion 106 and 5 mm in length Y thereof. Thus, six kinds of invention cells I1 to I6 were fabricated which were 15°, 30°, 40°, 45°, 60° and 80°, respectively, in the angle θ made by the current collector pressing face of the current collector pressing portion 106 and the surface of the flat platelike body 101 of the collector plate 100 as shown in FIG. 19.

Test

The cells described above were tested for performance for the comparison of power characteristics.

Tables 10 to 12 collectively show the constructions of the cells and the measurement of powers.

TABLE 10

| | PRO-TRUSION | OPENING RATIO (%) | INTEGRAL LEAD | SECTIONAL SHAPE OF PROTRUSION | FURROW WIDTH B (mm) | FURROW DEPTH H (mm) | COLLECTOR PLATE THICKNESS (mm) | PROTRUSION WALL THICKNESS (mm) | POWER DENSITY (W/kg) |
|---|---|---|---|---|---|---|---|---|---|
| CELL A | ○ | 50 | X | SEMICIRCULAR | — | 1.2 | 1.00 | 1.00 | 590 |
| CELL B1 | ○ | 10 | X | TRAPEZOIDAL | 1.6 | 1.2 | 1.00 | 1.00 | 599 |
| B2 | ○ | 15 | X | TRAPEZOIDAL | 1.6 | 1.2 | 1.00 | 1.00 | 599 |
| B3 | ○ | 30 | X | TRAPEZOIDAL | 1.6 | 1.2 | 1.00 | 1.00 | 598 |
| B4 | ○ | 50 | X | TRAPEZOIDAL | 1.6 | 1.2 | 1.00 | 1.00 | 598 |
| B5 | ○ | 70 | X | TRAPEZOIDAL | 1.6 | 1.2 | 1.00 | 1.00 | 595 |
| B6 | ○ | 90 | X | TRAPEZOIDAL | 1.6 | 1.2 | 1.00 | 1.00 | 593 |
| B7 | ○ | 93 | X | TRAPEZOIDAL | 1.6 | 1.2 | 1.00 | 1.00 | 590 |
| CELL C | ○ | 50 | ○ | TRAPEZOIDAL | 1.6 | 1.2 | 1.00 | 1.00 | 611 |
| CELL D1 | ○ | 50 | ○ | TRAPEZOIDAL | 0.6 | 1.2 | 1.00 | 1.00 | 600 |
| D2 | ○ | 50 | ○ | TRAPEZOIDAL | 0.8 | 1.2 | 1.00 | 1.00 | 606 |
| D3 | ○ | 50 | ○ | TRAPEZOIDAL | 1.0 | 1.2 | 1.00 | 1.00 | 608 |
| D4 | ○ | 50 | ○ | TRAPEZOIDAL | 1.2 | 1.2 | 1.00 | 1.00 | 610 |
| D5 | ○ | 50 | ○ | TRAPEZOIDAL | 1.6 | 1.2 | 1.00 | 1.00 | 611 |
| D6 | ○ | 50 | ○ | TRAPEZOIDAL | 1.6 | 0.3 | 1.00 | 1.00 | 601 |
| D7 | ○ | 50 | ○ | TRAPEZOIDAL | 1.6 | 0.5 | 1.00 | 1.00 | 607 |
| D8 | ○ | 50 | ○ | TRAPEZOIDAL | 1.6 | 0.8 | 1.00 | 1.00 | 609 |
| D9 | ○ | 50 | ○ | TRAPEZOIDAL | 1.6 | 1.2 | 1.00 | 1.00 | 611 |
| D10 | ○ | 50 | ○ | TRAPEZOIDAL | 1.6 | 1.6 | 1.00 | 1.00 | 613 |
| D11 | ○ | 50 | ○ | TRAPEZOIDAL | 1.6 | 2.0 | 1.00 | 1.00 | 615 |
| D12 | ○ | 50 | ○ | TRAPEZOIDAL | 1.6 | 2.5 | 1.00 | 1.00 | 616 |
| D13 | ○ | 50 | ○ | TRAPEZOIDAL | 1.6 | 3.0 | 1.00 | 1.00 | 616 |
| D14 | ○ | 50 | ○ | TRAPEZOIDAL | 1.6 | 3.5 | 1.00 | 1.00 | 616 |

TABLE 11

| | PRO-TRUSION | OPENING RATIO (%) | INTEGRAL LEAD | SECTIONAL SHAPE OF PROTRUSION | FURROW WIDTH B (mm) | FURROW DEPTH H (mm) | COLLECTOR PLATE THICKNESS (mm) | PROTRUSION WALL THICKNESS (mm) | POWER DENSITY (W/kg) |
|---|---|---|---|---|---|---|---|---|---|
| D15 | ○ | 50 | ○ | TRAPEZOIDAL | 1.6 | 1.2 | 0.05 | 0.05 | 590 |
| D16 | ○ | 50 | ○ | TRAPEZOIDAL | 1.6 | 1.2 | 0.10 | 0.10 | 597 |
| D17 | ○ | 50 | ○ | TRAPEZOIDAL | 1.6 | 1.2 | 0.20 | 0.20 | 602 |
| D18 | ○ | 50 | ○ | TRAPEZOIDAL | 1.6 | 1.2 | 0.50 | 0.50 | 608 |
| D19 | ○ | 50 | ○ | TRAPEZOIDAL | 1.6 | 1.2 | 1.00 | 1.00 | 611 |
| D20 | ○ | 50 | ○ | TRAPEZOIDAL | 1.6 | 1.2 | 1.50 | 1.50 | 614 |
| D21 | ○ | 50 | ○ | TRAPEZOIDAL | 1.6 | 1.2 | 2.00 | 2.00 | 616 |
| D22 | ○ | 50 | ○ | TRAPEZOIDAL | 1.6 | 1.2 | 2.50 | 2.50 | 616 |
| D23 | ○ | 50 | ○ | TRAPEZOIDAL | 1.6 | 1.2 | 3.00 | 3.00 | 616 |
| CELL E | ○ | 50 | ○ | TRAPEZOIDAL | 1.6 | 1.2 | 1.00 | 0.50 | 620 |
| CELL F | COMP. | | | | | | | | 540 |
| CELL G | COMP. | | | | | | | | 560 |
| CELL H | COMP. | ZERO | X | V-SHAPED | — | 1.2 | 1.00 | 1.00 | 570 |

TABLE 12

| | PRO-TRUSION | OPENING RATIO (%) | INTEGRAL LEAD | SECTIONAL SHAPE OF PROTRUSION | FURROW WIDTH B (mm) | FURROW DEPTH H (mm) | COLLECTOR PLATE THICKNESS (mm) | PROTRUSION WALL THICKNESS (mm) | ANGLE θ (°) | POWER DENSITY (W/kg) |
|---|---|---|---|---|---|---|---|---|---|---|
| I1 | ○ | 50 | ○ | TRAPEZOIDAL | 1.6 | 1.2 | 1.00 | 0.50 | 15 | 622 |
| I2 | ○ | 50 | ○ | TRAPEZOIDAL | 1.6 | 1.2 | 1.00 | 0.50 | 30 | 634 |
| I3 | ○ | 50 | ○ | TRAPEZOIDAL | 1.6 | 1.2 | 1.00 | 0.50 | 40 | 638 |
| I4 | ○ | 50 | ○ | TRAPEZOIDAL | 1.6 | 1.2 | 1.00 | 0.50 | 45 | 636 |
| I5 | ○ | 50 | ○ | TRAPEZOIDAL | 1.6 | 1.2 | 1.00 | 0.50 | 60 | 625 |
| I6 | ○ | 50 | ○ | TRAPEZOIDAL | 1.6 | 1.2 | 1.00 | 0.50 | 80 | 623 |
| CELL E | ○ | 50 | ○ | TRAPEZOIDAL | 1.6 | 1.2 | 1.00 | 0.50 | —(0) | 620 |

Comparison of Power Characteristics of Invention Cell A and Comparative Cells F, G, H For an power characteristics test, invention cell A and comparative cells F, G, H were charged at 0.125 C to 4.1 V, then discharged at 0.5 C to a depth of discharge of 40% and thereafter checked for power characteristics at a current value of 4 C for a discharge period of 10 seconds. Table 13 shows the result. The power density was determined by calculating the power value based on the voltage-current characteristics under the above conditions and dividing the result by the weight of the cell.

Incidentally, the conditions for laser welding for the fabrication of invention cell A were: laser power of 400 W, pulse frequency of 15 Hz and laser beam spot diameter D of 1 mm.

TABLE 13

| | POWER DENSITY (W/kg) |
|---|---|
| CELL A (INVENTION CELL) | 590 |
| CELL F (COMP. CELL) | 540 |
| CELL G (COMP. CELL) | 560 |
| CELL H (COMP. CELL) | 570 |

The result given in Table 13 reveals that invention cell A is higher than comparative cell F in power characteristics. This appears attributable to an increase in the internal resistance of comparative cell F resulting from small areas of welds produced by spot welding since the current collectors are as thin as 20 μm.

Comparative cell G had a higher power than comparative cell F but is inferior to invention cell A in power. This is attributable to the feature of invention cell A wherein the current was collected by four radial circular-arc protrusions 82 and which therefore exhibited a diminished current distribution, whereas comparative cell G had a structure for collecting the current from a portion, in circumferential direction, of the electrode unit and therefore exhibited a greater current distribution than invention cell A during high-rate discharge although the area of contact between the current collector and the current collector member was greater than in invention cell A.

Furthermore, comparative cell G requires work for inserting the current collector into the slits of the current collector member, hence a complex procedure, whereas in the case of invention cell A, the current collector plate needs only to be pressed against the current collector edge to ensure a simplified welding step.

In power, comparative cell H is higher than comparative cell G but lower than invention cell A. Although comparative cell H, like invention cell A, is adapted to collect the current from the entire current collector of the rolled-up electrode unit, the protrusion 91 is V-shaped in section as seen in FIG. 14, so that the width W' of the junction of the protrusion 91 and the current collector edge 78 is smaller than the width W of the junction of the circular-arc protrusion 82 and the current collector edge 78 notwithstanding that the protrusion 82 is the same as the protrusion 91 in depth and width. The difference in power is thought attributable to the smaller width W' which resulted in a smaller contact area.

Comparison of Power Characteristics of Invention Cells A and B4

Invention cell A and invention cell B4 were checked for the comparison of power characteristics in the case where the current collector plates thereof were welded under the same conditions, i.e., 400 W in laser power, and 15 Hz in pulse frequency. Table 14 shows the result. For an power characteristics test, the cells were charged at 0.125 C to 4.1 V, then discharged at 0.5 C to a depth of discharge of 40% and thereafter checked for power at a current value of 4 C for a discharge period of 10 seconds.

TABLE 14

| | POWER DENSITY (W/kg) |
|---|---|
| CELL A (INVENTION CELL) | 590 |
| CELL B4 (INVENTION CELL) | 598 |

The result of Table 14 reveals that invention cell B4 is superior to invention cell A in power characteristics, presumably because the trapezoidal protrusion 102 of cell B4 is greater than the circular-arc protrusion 82 of cell A in the area of contact of the protrusion with the current collector edge 78, and further because the portion of the cell B4 to be irradiated with the laser beam is flat over a wider area, permitting the laser beam energy to act more effectively to produce a weld over a sufficient junction area.

Comparison of Electrolyte Impregnation Time of Invention Cells B1–B7

Next, invention cells B1 to B7 were tested for impregnation with the electrolyte in the following manner and checked for the time taken for the rolled-up electrode unit to be impregnated with the electrolyte.

For each of invention cells B1 to B7, the rolled-up electrode unit having the current collector plates attached thereto was checked for weight and then placed into a container of SUS within a dry box having an argon gas atmosphere. The container was filled with the electrolyte and subjected to a pressure of 5 kg/cm². The electrode unit was withdrawn from the container every 10 minutes and checked for weight to measure the time taken for a predetermined amount of electrolyte to impregnate the electrode unit. Table 15 shows the result.

TABLE 15

| CELL | B1 | B2 | B3 | B4 | B5 | B6 | B7 |
|---|---|---|---|---|---|---|---|
| OPENING RATIO (%) | 10 | 15 | 30 | 50 | 70 | 90 | 93 |
| IMPREGNATION TIME (min.) | 60 | 40 | 30 | 20 | 20 | 20 | 20 |

The result of Table 15 indicates that if the opening area is smaller than 15%, the time taken for the electrolyte to completely impregnate the electrode unit greatly increases.

Next, cells were fabricated using other rolled-up electrode units having the same specifications as these electrode units, and tested for power characteristics for comparison. The result is given in Table 16. For testing, the cells were charged at 0.125 C to 4.1 V, then discharged at 0.5 C to a depth of discharge of 40% and checked for power at a current value of 4 C for a discharge period of 10 seconds.

TABLE 16

| CELL | B1 | B2 | B3 | B4 | B5 | B6 | B7 |
|---|---|---|---|---|---|---|---|
| OPENING RATIO (%) | 10 | 15 | 30 | 50 | 70 | 90 | 93 |
| OUTPUT DENSITY (W/kg) | 599 | 599 | 598 | 598 | 595 | 593 | 590 |

The result of Table 16 reveals that the power characteristics markedly become impaired if the opening ratio of the current collector plate given by the liquid inlets thereof exceeds 90%. Presumably, the reason is that almost entire area of the current collector plate other than the protrusions then serves to provide openings to result in a lower current collecting efficiency.

The result described above indicates that the opening ratio of the current collector plate given by the liquid inlets is preferably in the range of 15% to 90%.

Comparison of Power Characteristics of Invention Cells B4 and C

Invention cell B4 and invention cell C were charged at 0.125 C to 4.1 V, then discharged at 0.5 C to a depth of discharge of 40% and thereafter checked for power at a current value of 4 C for a discharge period of 10 seconds. Table 17 shows the result.

TABLE 17

| | POWER DENSITY (W/kg) |
|---|---|
| CELL B4 (INVENTION CELL) | 598 |
| CELL C (INVENTION CELL) | 611 |

The result of Table 17 reveals that invention cell C is superior to invention cell B4 in power characteristics. Presumably, the reason is that the lead of the current collector is formed integrally therewith in invention cell C, whereas the lead is welded to the current collector plate in invention cell B4 and therefore has increased contact resistance, leading to the difference in power characteristics.

Comparison of Power Characteristics of Invention Cells D1–D5

Invention cells D1 to D5 were checked for the comparison of power characteristics in the case where the current collector plates thereof were welded under the same conditions, i.e., 400 W in laser power, and 15 Hz in pulse frequency. Table 18 shows the result. The laser beam was 1 mm in spot diameter. For an power characteristics test, the cells were charged at 0.125 C to 4.1 V, then discharged at 0.5 C to a depth of discharge of 40% and checked for power at a current value of 4 C for a discharge period of 10 seconds.

TABLE 18

| CELL | D1 | D2 | D3 | D4 | D5 |
|---|---|---|---|---|---|
| FURROW WIDTH/SPOT DIAM. | 0.6 | 0.8 | 1.0 | 1.2 | 1.6 |
| POWER DENSITY (W/kg) | 600 | 606 | 608 | 610 | 611 |

The result of Table 18 reveals that when the furrow width at the bottom of the furrow forming the collector plate protrusion is smaller than 0.8 times the spot diameter D of the laser beam, the power greatly reduces. Presumably, the reason is that if the furrow width of the protrusion is smaller than 0.8 times the laser beam spot diameter D, the laser beam is projected onto opposite ends of the protrusion, i.e., regions not to be welded to the current collector edge, whereby the energy of the laser beam to be used effectively for welding is diminished, failing to fully melt the portions to be welded and consequently reducing the area of contact between the collector plate and the current collector edge to result in an impaired current collecting efficiency.

Accordingly, it is desired that the furrow width of the collector plate protrusion be at least 0.8 times the spot diameter D of the laser beam.

Comparison of Power Characteristics of Invention Cells D6–D14

Invention cells D6 to D14 were checked for the comparison of power characteristics in the case where the current collector plates thereof were welded under the same conditions, i.e., 400 W in laser power, and 15 Hz in pulse frequency. Table 19 shows the result. The laser beam was 1 mm in spot diameter. For an power characteristics test, the cells were charged at 0.125 C to 4.1 V, then discharged at 0.5 C to a depth of discharge of 40% and checked for power at a current value of 4 C for a discharge period of 10 seconds.

TABLE 19

| CELL | D6 | D7 | D8 | D9 | D10 | D11 | D12 | D13 | D14 |
|---|---|---|---|---|---|---|---|---|---|
| FURROW DEPTH (mm) | 0.3 | 0.5 | 0.8 | 1.2 | 1.6 | 2.0 | 2.5 | 3.0 | 3.5 |
| POWER DENSITY (W/kg) | 601 | 607 | 609 | 611 | 613 | 615 | 616 | 616 | 616 |

The result of Table 19 reveals that when the furrow depth of the protrusion is smaller than 0.5 mm, the power greatly reduces. Presumably, the reason is that if the furrow depth of the protrusion is smaller than 0.5 mm, the protrusion will not fully wedge into all turns of the current collector in the case where the edge portions of turns of the current collector of the rolled-up electrode unit are not positioned in a plane, consequently resulting in a decreased area of contact to entail a lower current collecting efficiency.

Further the power characteristics remain unaltered even if the furrow depth of the protrusion is greater than 3 mm presumably because even if the furrow depth is greater than 3 mm, the effect to increase the area of contact remains unchanged since the variations in the position of the current collector edge of the rolled-up electrode unit are usually up to 2 mm. However, if the furrow depth of the current collector plate protrusion is excessively large, the collector plate occupies a greater volume in the interior of the battery can to diminish the volumetric energy density of the cell.

Accordingly, it is preferred that the furrow depth of the collector plate protrusion be in the range of 0.5 mm to 3 mm.

Comparison of Power Characteristics of Invention Cells D15–D23

Invention cells D15 to D23 were checked for power characteristics in the case where the current collector plates thereof were welded under the same conditions, i.e., 400 W in laser power, and 15 Hz in pulse frequency. Table 20 shows the result. For an power characteristics test, the cells were charged at 0.125 C to 4.1 V, then discharged at 0.5 C to a depth of discharge of 40% and checked for power at a current value of 4 C for a discharge period of 10 seconds.

TABLE 20

| CELL | D15 | D16 | D17 | D18 | D19 | D20 | D21 | D22 | D23 |
|---|---|---|---|---|---|---|---|---|---|
| THICKNESS (mm) | 0.05 | 0.1 | 0.2 | 0.5 | 1.0 | 1.5 | 2.0 | 2.5 | 3.0 |
| POWER DENSITY (W/kg) | 590 | 597 | 602 | 608 | 611 | 614 | 616 | 616 | 616 |

The result of Table 20 reveals that when the thickness of the current collector plate is smaller than 0.1 mm, the power greatly reduces. Presumably, the reason is that when having a thickness smaller than 0.1 mm, the collector plate has increased electric resistance to exhibit an impaired current collecting efficiency. However, even if the thickness of the collector plate is made greater than 2 mm, the effect to improve the current collecting efficiency levels off, while the lead portion projecting from the collector plate then becomes less amenable to working such as bending.

Accordingly, it is desirable that the thickness of the current collector plate be in the range of 0.1 mm to 2 mm.

Comparison of Power Characteristics of Invention Cells D5 and E

Invention cells D5 and E were checked for power characteristics in the case where the current collector plates thereof were welded under the same conditions, i.e., 350 W in laser power, and 15 Hz in pulse frequency. Table 21 shows the result. For an power characteristics test, the cells were charged at 0.125 C to 4.1 V, then discharged at 0.5 C to a depth of discharge of 40% and checked for power at a current value of 4 C for a discharge period of 10 seconds.

TABLE 21

| | POWER DENSITY (W/kg) |
|---|---|
| CELL D5 (INVENTION CELL) | 611 |
| CELL E (INVENTION CELL) | 620 |

The result of Table 21 reveals that invention cell E is superior to invention cell D5 in power characteristics. The reason is that although there is no difference between cells E and D5 in the electric resistance of the current collector plate since the collector plates of these cells have the same thickness, the protrusion of the cell E to be irradiated with the laser beam is smaller in wall thickness, permitting a smaller quantity of laser energy to melt the junction to be welded and consequently realizing welding over a large contact area to result in a higher current collecting efficiency.

Study on Radius R of Circular-Arc Protrusions in Invention Cell A

Six kinds of cells were fabricated which had the same construction as invention cell A except that the cells were given varying values of 0.2 mm, 0.4 mm, 0.6 mm, 1.0 mm, 1.2 mm and 1.6 mm, respectively, for the inside radius R of the circular-arc protrusion 82 of the current collector plate 8. The current collector plates 8 of the cells were 1 mm in the thickness of the flat platelike body 81, 1 mm in wall thickness of the circular-arc protrusion 82 and 1.2 mm in the furrow depth of the protrusion 82. The current collector plates 8 of the cells were welded under the same conditions, i.e., 400 W in laser power, and 15 Hz in pulse frequency. To test the cells for power characteristics, the cells were charged at 0.125 C to 4.1 V, then discharged at 0.5 C to a depth of discharge of 40% and checked for power characteristics at a current value of 4 C for a discharge period of 10 seconds. Table 22 shows the result.

TABLE 22

| FURROW RADIUS (mm) | 0.2 | 0.4 | 0.6 | 1.0 | 1.2 | 1.6 |
|---|---|---|---|---|---|---|
| [RADIUS/SPOT DIAM.] | [0.2] | [0.4] | [0.6] | [1.0] | [1.2] | [1.6] |
| POWER DENSITY (W/kg) | 580 | 585 | 586 | 588 | 590 | 591 |

The result of Table 22 indicates that excellent power characteristics are available when the radius R of the circular-arc protrusion 82 of the current collector plate 8 is at least 0.4 times the spot diameter D of the laser beam. Presumably, the reason is that if the radius R of the protrusion 82 is smaller than 0.4 times the laser beam spot diameter D, the laser beam is projected onto opposite ends of the protrusion 82, i.e., regions not to be welded to the current collector edge 78, whereby the energy of the laser beam to be used effectively for welding is diminished, failing to fully melt the portions to be welded and consequently reducing the area of contact between the collector plate and the current collector edge to result in an impaired current collecting efficiency.

Accordingly, it is desired that the radius R of circular-arc protrusion 82 of the current collector plate 8 be at least 0.4 times the spot diameter D of the laser beam.

Study on Angle θ Made by Current collector Pressing Face and Current Collector Body Surface in Invention Cells I Invention cells I1 to I6 and invention cell E (wherein the angle θ is 0°) were tested for power characteristics. The current collector plates 100 of the cells were welded under the same conditions, i.e., 400 W in laser power, and 15 Hz in pulse frequency. For testing, the cells were charged at 0.125 C to 4.1 V, then discharged at 0.5 C to a depth of discharge of 40% and checked for power characteristics at a current value of 4 C for a discharge period of 10 seconds. Table 23 shows the result.

TABLE 23

| CELL | E | I1 | I2 | I3 | I4 | I5 | I6 |
|---|---|---|---|---|---|---|---|
| ANGLE θ (°) | — (0) | 15 | 30 | 40 | 45 | 60 | 80 |
| POWER DENSITY (W/kg) | 620 | 622 | 634 | 638 | 636 | 625 | 623 |

The result of Table 23 indicates that invention cells I1 to I6 wherein the current collector pressing portions 106 are formed exhibit a higher power density than invention cell E (wherein the angle θ is 0°) Presumably, the reason is that the current collector pressing portion 106 deflects the end portion of the current collector 77 inwardly of the electrode unit 7 by pressing the end portion, whereby the position of contact of the collector plate protrusion 102 with the current collector is shifted also inwardly of the unit 7, consequently permitting the current collector portion positioned at the outer periphery of the electrode unit 7 to be welded like other current collector portions and ensuring a large junction area to achieve an improved current collecting efficiency.

It will also be understood that more excellent power characteristics are available when the angle θ is at least 30° to not greater than 45°. This is because if the angle θ is smaller than 30°, the end portion of the current collector 77 of the rolled-up electrode 7 will not be fully deflected inward, and further because if the angle θ is greater than 45°, the current collector pressing portion 106 will be forced into the end portion of the rolled-up electrode unit 7, failing to fully deflect the end portion of the current collector 77 inward. Resulting in either case is only a small inward shift in the position of contact between the current collector end portion of the electrode unit 7 and the collector plate protrusion 102, so that a sufficiently large area of junction is not available. Accordingly, the angle θ to be made by the current collector pressing face of the current collector pressing portion 106 and the surface of flat platelike body 101 of the current collector plate is preferably at least 30° to not greater than 45°.

The cells of the present invention are not limited to the foregoing embodiments in construction but can be modified variously within the technical scope set forth in the appended claims. For example, ferritic stainless steel or martensitic stainless steel is also usable as the material for the metal layer of the negative electrode current collector plate 3. Although the laser beam is used for welding the current collector plate according to the embodiments described, this method of welding is not limitative but an electron beam is also usable for welding. The present invention can be embodied not only as lithium ion secondary cells but as a wide variety of nonaqueous electrolyte secondary cells.

What is claimed is:

1. A nonaqueous electrolyte secondary cell comprising an electrode unit (2) encased in a battery can and comprising a positive electrode (23) and a negative electrode (21) each in the form of a strip and a separator (22) interposed between the electrodes, the cell being adapted to deliver electric power generated by the electrode unit (2) to the outside via a positive terminal portion and a negative terminal portion which are provided on the container, a negative electrode current collector plate (3) comprising a plurality of layers including a copper layer (31) made of copper or an alloy consisting predominantly of copper, and a metal layer made of a metal not forming an intermetallic compound with lithium and having a lower laser beam reflectivity than copper or an alloy consisting predominantly of the metal, the copper layer (31) and the metal layer forming opposite surface layers of the collector plate (3), the copper layer (31) being welded to an edge of the negative electrode (21) projecting at one of opposite ends of the electrode unit (2) in the direction of a winding axis thereof, and the negative electrode current collector plate (3) being electrically connected to the negative terminal portion.

2. A nonaqueous electrolyte secondary cell according to claim 1 wherein the metal forming the metal layer of the negative electrode current collector plate (3) is nickel.

3. A nonaqueous electrolyte secondary cell according to claim 1 wherein the metal forming the metal layer of the negative electrode current collector plate (3) is stainless steel.

4. A nonaqueous electrolyte secondary cell according to claim 1 wherein the copper layer (31) of the negative electrode current collector plate (3) is welded to the edge of the negative electrode (21) with a laser beam.

5. A nonaqueous electrolyte secondary cell according to claim 2 wherein the cooper layer (31) of the negative electrode current collector plate (3) is welded to the edge of the negative electrode (21) with a laser beam.

6. A nonaqueous electrolyte secondary cell according to claim 3 wherein the copper layer (31) of the negative electrode current collector plate (3) is welded to the edge of the negative electrode (21) with a laser beam.

7. A nonaqueous electrolyte secondary cell according to claim 1 wherein the negative electrode current collector plate (3) has a thickness in the range of 0.10 mm to 5.00 mm.

8. A nonagueous electrolyte secondary cell according to claim 2 wherein the negative electrode current collector plate (3) has a thickness in the range of 0.10 mm to 5.00 mm.

9. A nonaqueous electrolyte secondary cell according to claim 3 wherein the negative electrode current collector plate (3) has a thickness in the range of 0.10 mm to 5.00 mm.

10. A nonaqueous electrolyte secondary cell according to claim 4 wherein the negative electrode current collector plate (3) has a thickness in the range of 0.10 mm to 5.00 mm.

11. A nonaqueous electrolyte secondary cell according to claim 5 wherein the negative electrode current collector plate (3) has a thickness in the range of 0.10 mm to 5.00 mm.

12. A nonaqueous electrolyte secondary cell according to claim 6 wherein the negative electrode current collector plate (3) has a thickness in the range of 0.10 mm to 5.00 mm.

13. A nonaqueous electrolyte secondary cell according to claim 2 wherein the ratio of the thickness of the nickel layer (32) to the thickness of the negative electrode current collector plate (3) is in the range of at least 5% to not greater than 45%.

14. A nonaqueous electrolyte secondary cell according to claim 3 wherein the ratio of the thickness of the stainless steel layer (35) to the thickness of the negative electrode current collector plate (3) is in the range of at least 5% to not greater than 45%.

* * * * *

UNITED STATES PATENT AND TRADEMARK OFFICE
CERTIFICATE OF CORRECTION

PATENT NO. : 6,730,438 B2 Page 1 of 1
DATED : May 4, 2004
INVENTOR(S) : Naoya Nakanishi et al.

It is certified that error appears in the above-identified patent and that said Letters Patent is hereby corrected as shown below:

Column 32,
Line 40, "nonagueous" should be -- nonaqueous --.

Signed and Sealed this

Twenty-second Day of February, 2005

JON W. DUDAS
*Director of the United States Patent and Trademark Office*